July 4, 1950     T. L. PECKINPAUGH     2,513,355
METHOD OF AND APPARATUS FOR TRANSPORTING
REFRIGERATED COMMODITIES Filed March 20, 1947     12 Sheets-Sheet 1

THOMAS L. PECKINPAUGH.
INVENTOR.

BY Beale and Jones
ATTORNEYS.

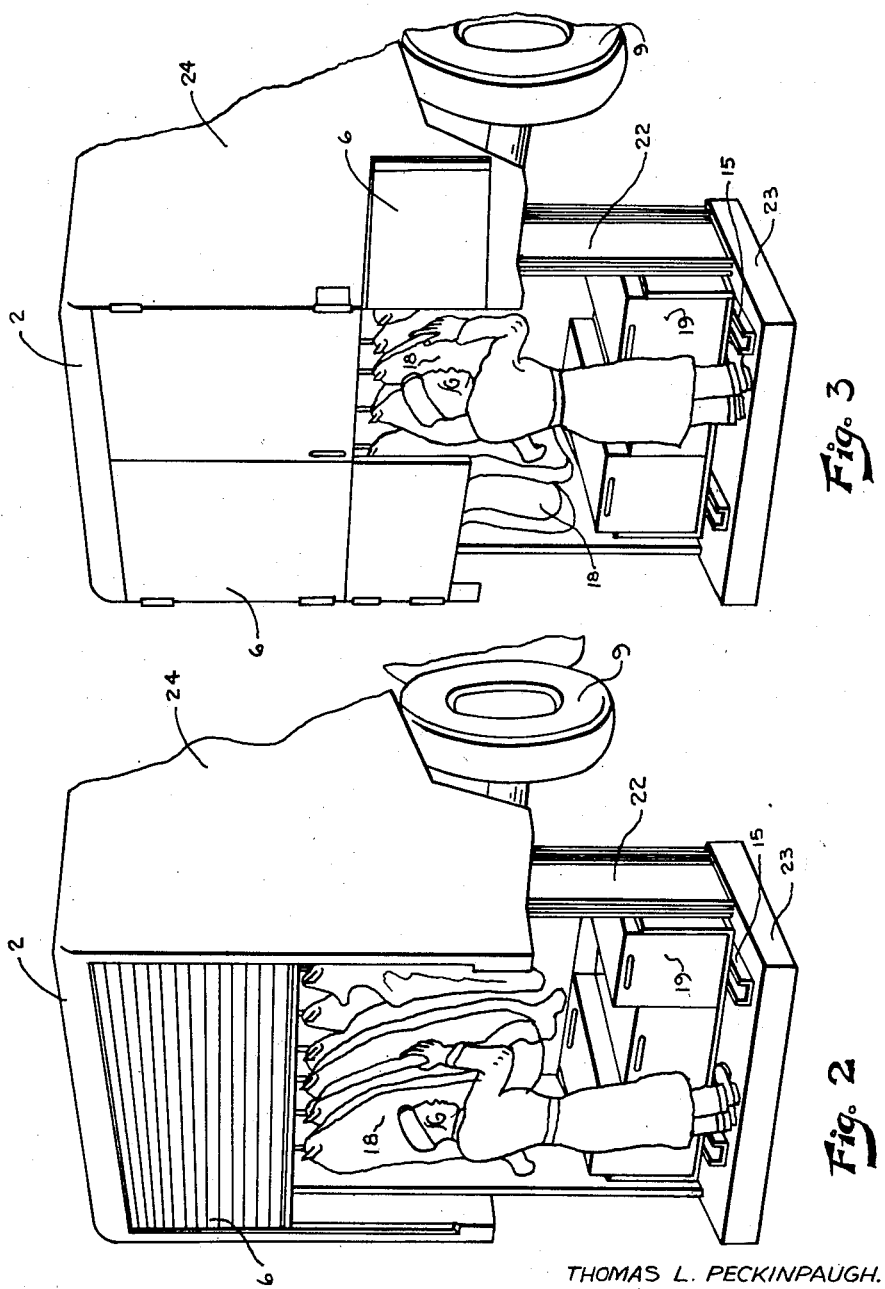

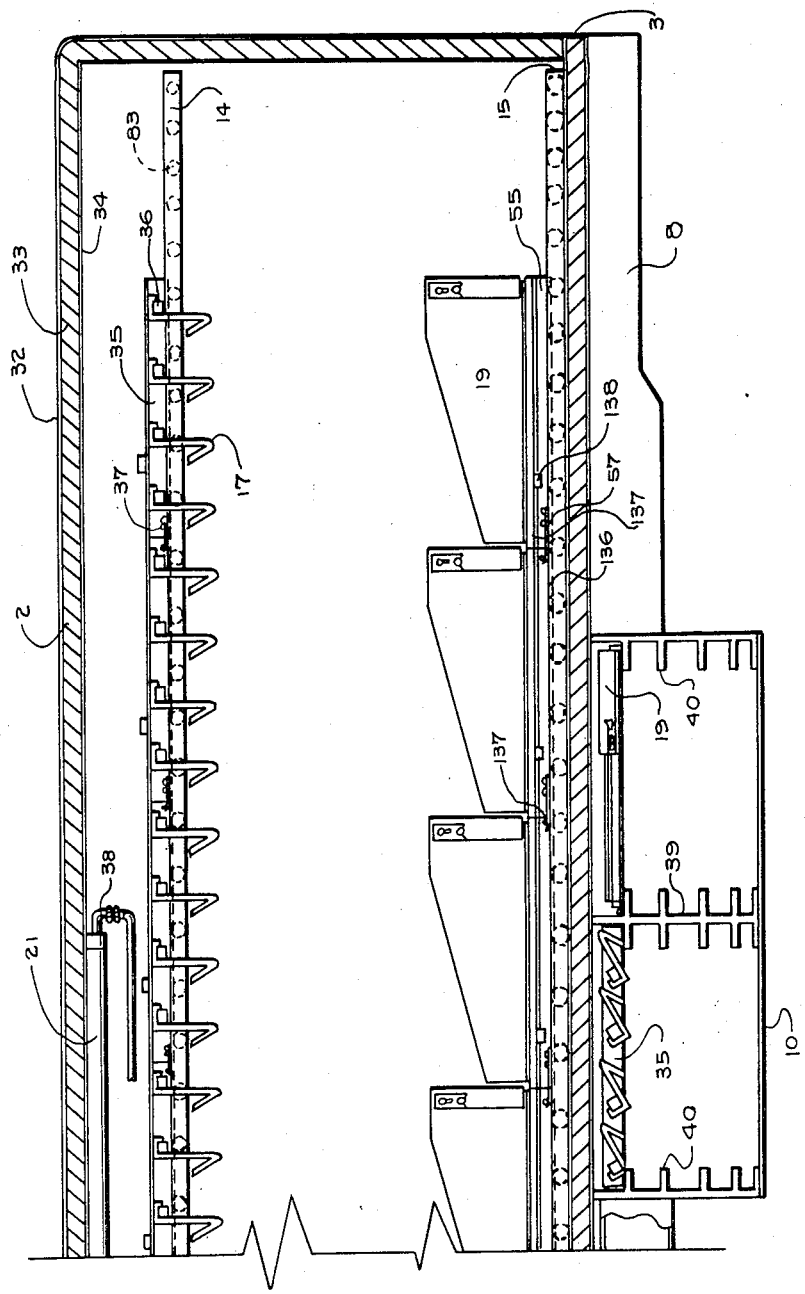

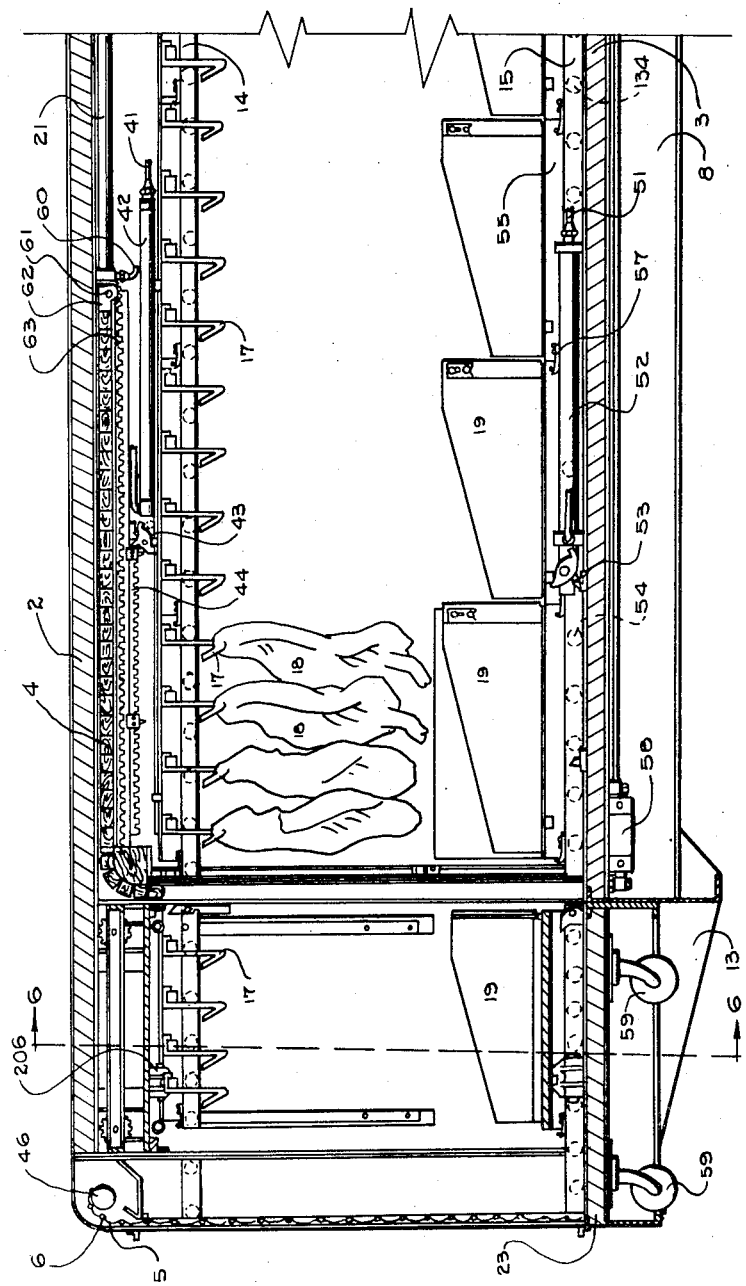

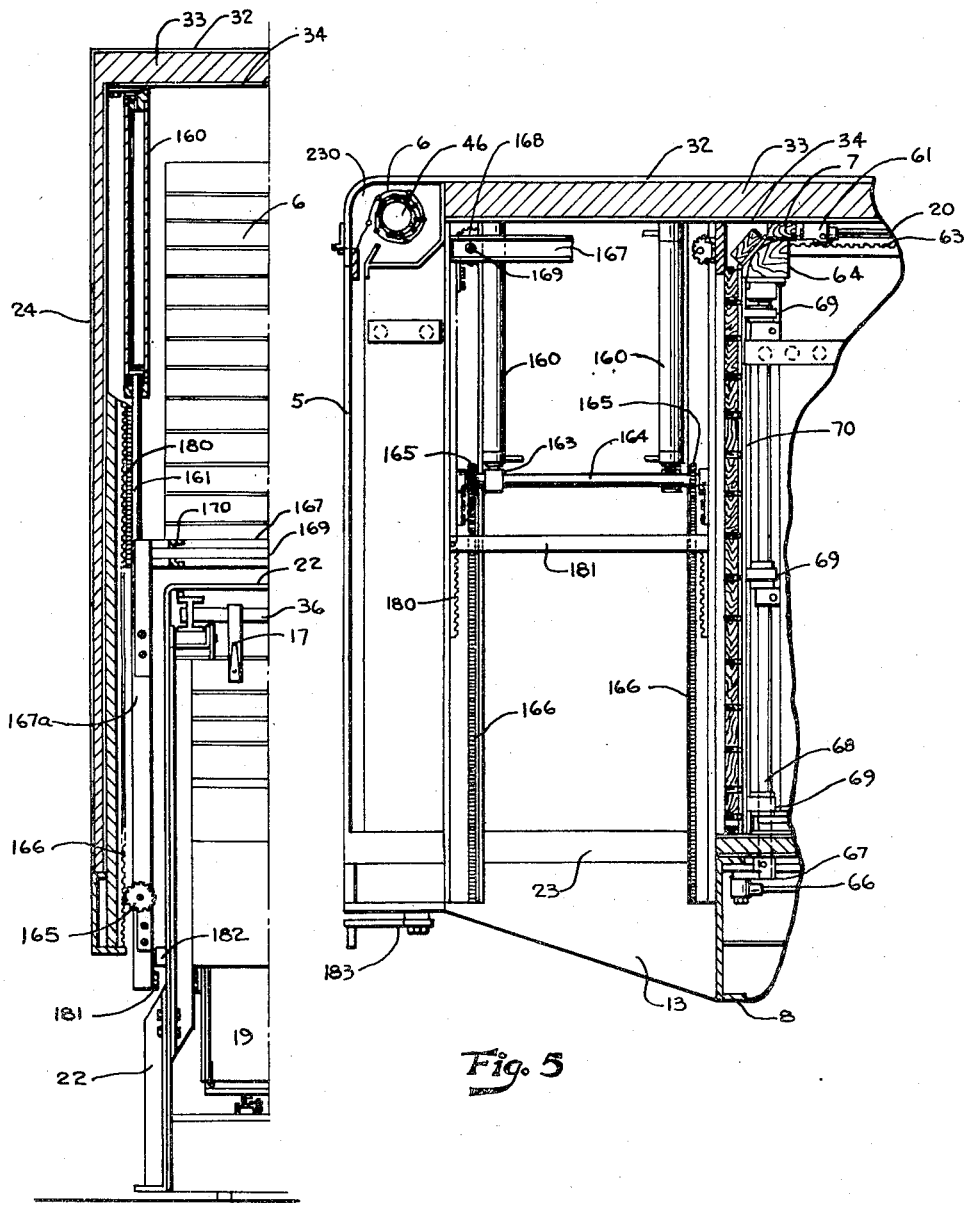

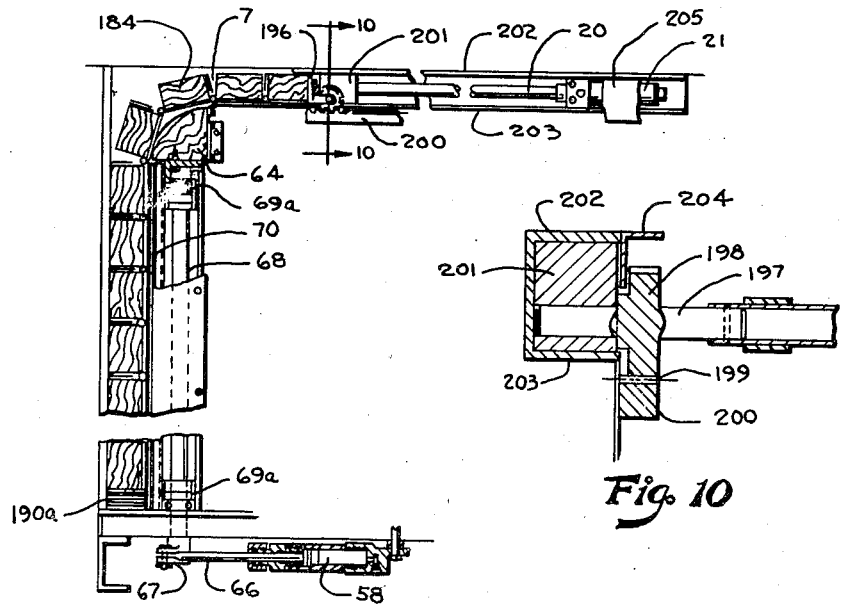
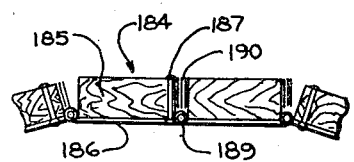
Fig. 7
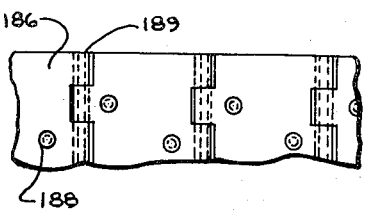
Fig. 10
Fig. 9
Fig. 8
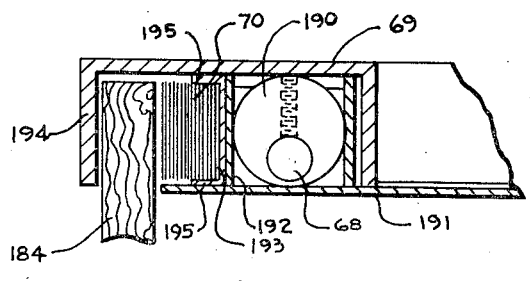
Fig. 11
THOMAS L. PECKINPAUGH,
INVENTOR.
BY Beale and Jones
ATTORNEYS.

July 4, 1950

T. L. PECKINPAUGH 2,513,355

METHOD OF AND APPARATUS FOR TRANSPORTING
REFRIGERATED COMMODITIES

Filed March 20, 1947

THOMAS L. PECKINPAUGH.
INVENTOR.

BY Beale and Jones.
ATTORNEYS.

July 4, 1950
T. L. PECKINPAUGH
2,513,355
METHOD OF AND APPARATUS FOR TRANSPORTING
REFRIGERATED COMMODITIES
Filed March 20, 1947
12 Sheets-Sheet 9
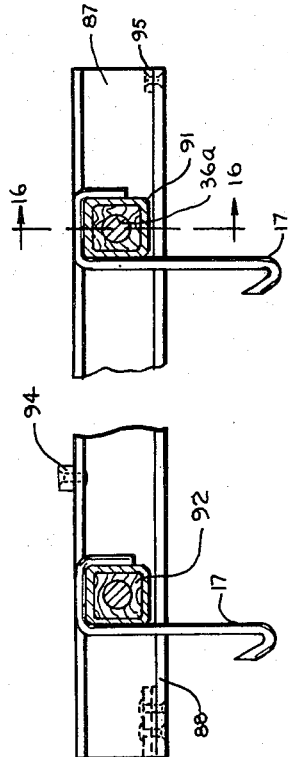
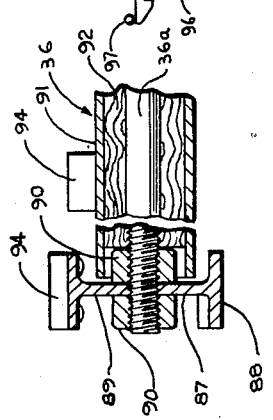
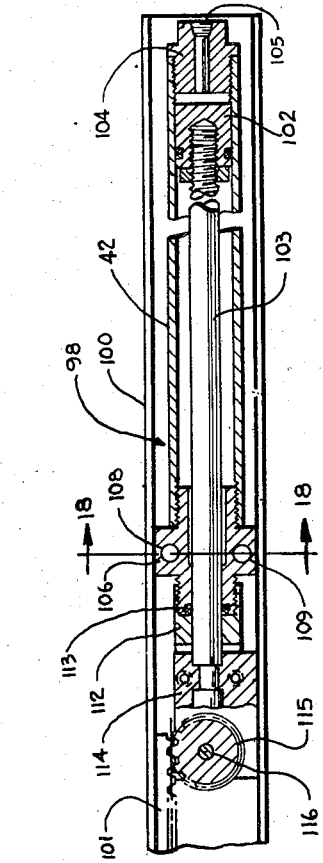
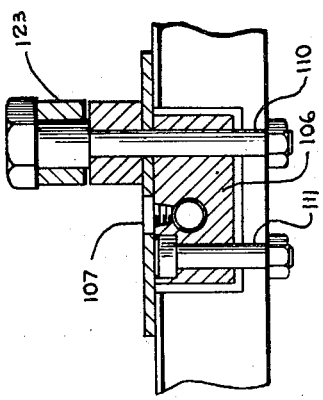
THOMAS L. PECKINPAUGH
INVENTOR.
BY Beale and Jones
ATTORNEYS.

July 4, 1950 T. L. PECKINPAUGH 2,513,355
METHOD OF AND APPARATUS FOR TRANSPORTING
REFRIGERATED COMMODITIES
Filed March 20, 1947 12 Sheets-Sheet 10

THOMAS L. PECKINPAUGH,
INVENTOR.

BY Beale and Jones.
ATTORNEYS.

July 4, 1950          T. L. PECKINPAUGH         2,513,355
METHOD OF AND APPARATUS FOR TRANSPORTING
REFRIGERATED COMMODITIES
Filed March 20, 1947                        12 Sheets-Sheet 11
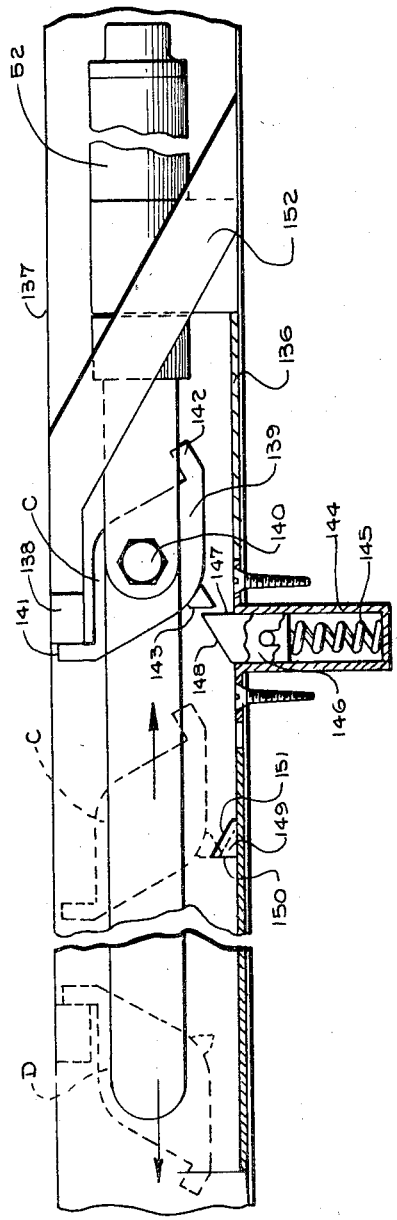
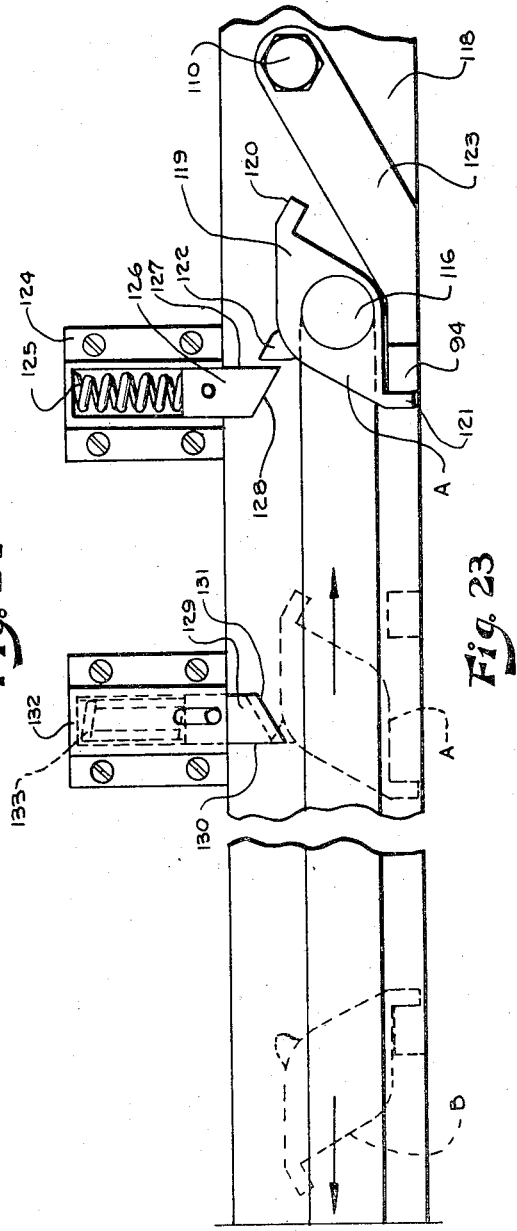
THOMAS L. PECKINPAUGH.
INVENTOR.
BY Beale and Jones
ATTORNEYS.

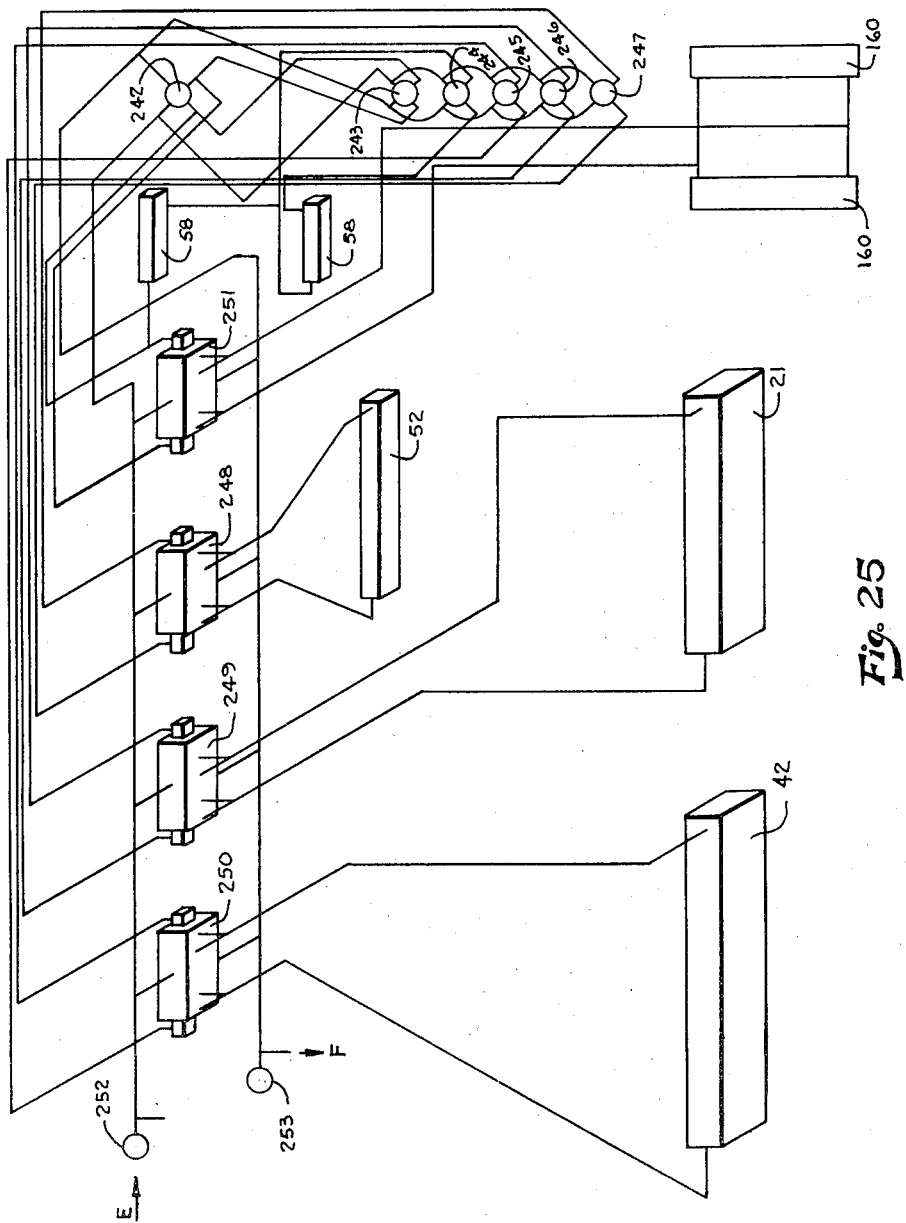

Patented July 4, 1950

2,513,355

UNITED STATES PATENT OFFICE 2,513,355

METHOD OF AND APPARATUS FOR TRANSPORTING REFRIGERATED COMMODITIES

Thomas L. Peckinpaugh, Downey, Calif., assignor to Transit Freese, Inc., Reno, Nev., a corporation of Nevada Application March 20, 1947, Serial No. 735,898

25 Claims. (Cl. 62—170)

My invention pertains to a vehicle adapted to transport perishable commodities, more particularly cold, chilled, frozen or refrigerated commodities such as meats and other food products and to a method of loading and unloading a mobile vehicle to permit less than carload deliveries therefrom, without vitiating the refrigerated conditions within the vehicle.

With more particularity, my invention pertains, as to the apparatus, to a vehicle adapted to maintain within one portion thereof a quantity of perishable commodities kept under desired conditions of relatively low temperature and further adapted to permit withdrawal of increments of such commodities without markedly modifying the environment in which the remaining commodities are maintained.

With more particularity my invention pertains as to the method, to a method of loading perishable commodities into a mobile, primary insulated chamber provided with a movable insulated partition adapted to seal off the chamber so as to maintain a desired degree of refrigeration therein, the loading being accomplished in such manner as to permit the withdrawal of selected increments of the commodities, the placing of such selected increments in an enclosed elevator which may be lowered to the ground or to any appropriate delivery level meanwhile, re-establishing the insulating partition to seal off the primary insulated chamber, thus permitting the removal of the desired increment of commodities from the elevator without destroying or vitiating the desired refrigerating conditions of the remaining commodities in the vehicle.

Due to geographical and economic factors perishable commodities and more particularly meats and other foods are generally shipped from the farm, ranch or other unit of production to a processing point. In the case of meat, for example, the livestock moves to a slaughter house and processing centers. There are in the United States a relatively few large slaughter houses and packing plants which handle the bulk of the meat marketed in this country. The larger of such centers are located in the Midwest reasonably adjacent the geographical center of this country. There are, however, other existing slaughter houses and packing plants located adjacent the Atlantic Seaboard and the Pacific Seaboard and to a certain extent adjacent some of the more densely populated areas. In thickly populated areas reasonably close to such slaughter houses and packing plants the delivery of meat to the ultimate individual consumer customarily funnels through rapid transportation channels from the slaughter houses and packing plants to refrigerated wholesale warehouses and thence by truck to adjacent retail stores, hotels, restaurants, and like establishments, which supply the ultimate individual consumer.

The volume of demand by the ultimate consumer in the aggregate determines the size of the refrigerated wholesale warehouse facilities and the "turnover" therein. It also determines the type and speed of the transportation utilized in delivering the meat from the wholesale warehouse to the retail establishment be it store, hotel, restaurant, or the like. In heavily populated areas the volume of demand in normal times is such as to permit frequent, that is daily or even more-often-than daily, deliveries from the wholesale warehouse to a given individual retail establishment. This is particularly true where the distances between the retailer and wholesale warehouse are not too great.

There are many difficulties in this system of distribution which results in considerable spoilage of meat during its initial shipment from the major slaughter houses and packing plants and an even greater degree of spoilage in the shipment from the wholesale warehouses to more remote retail establishments. In some portions of the country the distribution system virtually breaks down to the extent that it is difficult, if not impossible, for the ultimate consumer to obtain meat which has a flavor and freshness anywhere near approaching that obtainable by the more fortunate consumer who happens to be located in a center of population such as Kansas City or Chicago adjacent a major slaughter house and packing plant. Whatever has been said above with relation to meat applies in principle to other perishable commodities such as fresh vegetables or frozen foods, and applies also regardless of the manner in which such commodities are packed.

I have observed that in the delivery of perishable commodities, such as meat, there are many fairly-widely-separated small communities whose supply of such commodities can only be obtained by rail delivery, truck delivery, and very recently, air freight or air express delivery. Many of these communities are too small to require, even through all of the retail establishments in a particular community, deliveries of as much as a carload or truckload of a given perishable commodity or even a carload of a plurality of assorted perishable commodities. I have also observed that while a fairly high standard of refrigeration may be obtained in modern refrigerated vehicles, such maintenance of refrigeration is effective only so long as the vehicle exists completely sealed and in its original refrigerated condition. The opening of a refrigerated seal of such vehicles is invariably followed by a rise of temperature within the vehicle and generally followed by appreciable if not damaging loss of the refrigerated conditions therein. This disadvantage is not insuperable if the entire contents of refrigerated vehicles are to be unloaded and immediately transported to a refrigerated storage warehouse. It is not insuperable as to the first increment of commodities withdrawn from the vehicle where a less than carload delivery is being made, but where less than carload delivery is being made the remaining commodities within the opened refrigerated vehicle invariably deteriorate. This deterioration is accentuated in direct proportion to the prevailing outside temperature and to the distance the vehicle has to travel between each discharge point on a less than carload trip.

My invention contemplates the overcoming of such disadvantages everywhere throughout the United States but with greater emphasis on areas which are sparsely settled and which are characterized by relatively large distances between centers of population. I contemplate utilization of my invention with even greater emphasis on such areas which, because of climatic conditions, are subject to periods of high temperature as, for instance, certain portions of southern California, Nevada, Arizona, New Mexico and Texas.

My invention is particularly concerned with a method of loading such perishable commodities for less than carload delivery and to a vehicle which will permit less than carload deliveries of perishable commodities while maintaining the unloaded commodities under satisfactory conditions of refrigeration and sanitation on a particular trip. I have mentioned sanitation, just above, because in some of the more arid areas and also in some of the highly industrialized areas considerable contamination, and damage, if not spoilage, of perishable commodities results from windborne dust, soot and similar contaminants, not to mention airborne bacteria, disease organisms and organisms which promote decomposition or fermentation, which may readily enter conventional refrigerated vehicles when opened for removal and delivery of commodities therefrom.

My invention, therefore, has for an object the provision of conditions which maintain the maximum desired refrigeration of perishable commodities during transportation and delivery thereof and more particularly when such deliveries are in less than carload increments. A further important object of my invention is the provision of a method and means for handling perishable commodities, exemplified by meats and other food products, with maximum maintenance of refrigeration, maximum sanitation and protection and with a minimum opportunity for contact with sources of contamination.

Another important object of my invention is the provision of an apparatus and a method for the handling, transporting and delivery of perishable commodities with a maximum amount of speed and a minimum amount of labor. A still further important object of my invention is to facilitate the door-to-door delivery of perishable commodities in less than carload quantities without loss or spoilage of the commodities even where the points of delivery are geographically widely separated and subject to atmospheric conditions which normally foster high spoilage and loss when deliveries are performed in the normal manner. Other objects and advantages of my invention will be apparent from the following description and with reference to the accompanying drawings.

Referring to the drawings wherein like reference numerals pertain to like or similar elements, Figure 1 is a side elevation of an embodiment of my invention as pertains to a mobile, trackless, vehicle. This side elevation is in cross section and shows the interior of the vehicle with its over-all arrangement. Due to the limitations imposed by the size of patent application drawings and the actual size of the vehicle many of the elements shown on Figure 1 are portrayed in outline rather than detail.

Figure 2 shows a perspective end view of the rear end of the vehicle with the rearmost partition or door partially opened so as to reveal the interior of the secondary compartment and elevator which constitutes an important feature of my invention.

Figure 3 shows a view very similar to Figure 2 but in which a different arrangement of doors has been provided.

Figure 1:
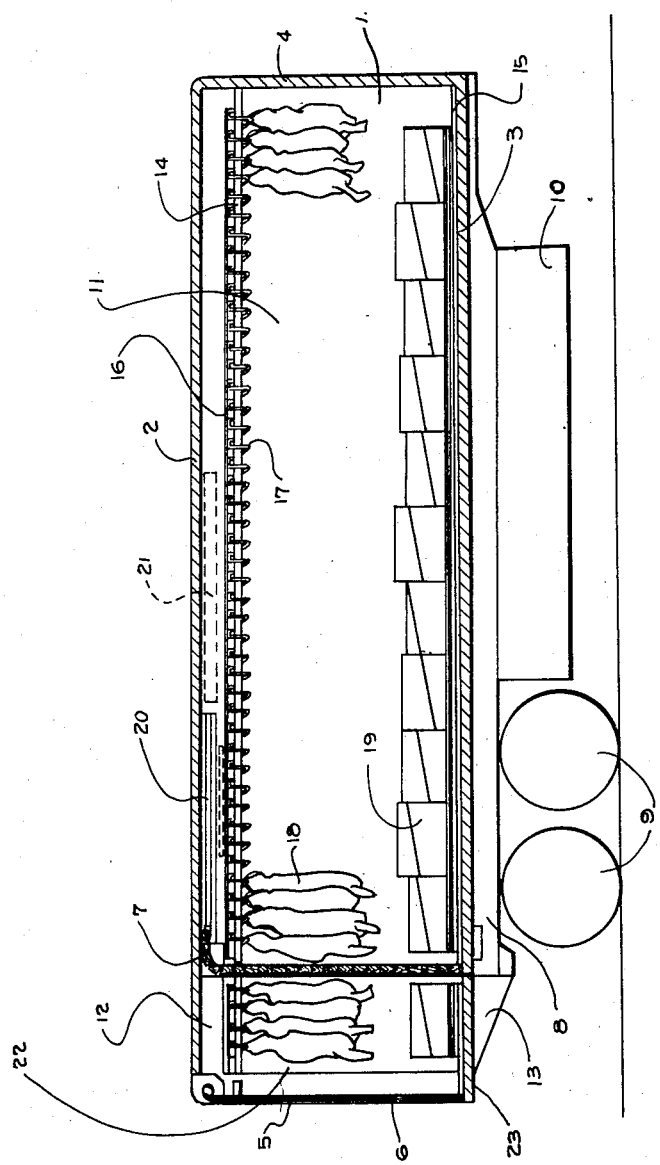

Figures 4a and 4b are a somewhat enlarged composite of the view shown in Figure 1. Both views show a side view in cross section of the interior of one form of vehicle, Figure 4a representing the front end of the vehicle and Figure 4b representing the rearward end of the vehicle. These two sheets of drawings are designed to be placed in juxtaposition with Figure 4b on the left and Figure 4a on the right. They are also designed to show in greater detail and with more particularity some of the elements which could only be shown in outline on Figure 1.

Figure 5 is a side view in cross section of the rear portion of the vehicle and shows the assembly of elements which comprise a secondary end chamber or compartment which is integral with the vehicle as also shown in Figure 4b. In Figure 4b the elevator is shown in position while in Figure 5 the elevator has been removed.

Figure 6 is a vertical cross sectional view showing in more detail the elevating mechanism with the elevator in lowered position when viewed as taken along the line 6, 6 of Figure 4b. It will be understood that Figure 6 is but a fragmentary view of the left side, there being a corresponding and matching right side not shown in Figure 6.

Figure 7 is a side elevation partially in cross section and partially broken away to show the construction of an operative means for elevating and lowering the partition door, and for sealing the partition door when in lowered position.

Figure 8 is a detail of the combined wooden and metal units which form the partition door.

Figure 9 is a detail of the method of assembling the metal links for construction of the partition door.

Figure 10 is a cross sectional detailed view of the gear and rack assembly utilized in controlling the movements of a partition door taken in cross section along the line 10, 10 of Figure 7. It will be understood that Figure 10 is but a fragment of one end of such assembly and that the opposite, undisclosed end is formed of equivalent or identical counterparts.

Figure 11 is a cross sectional detail of the arrangement of elements used in sealing or unsealing the partition door.

Figure 12:
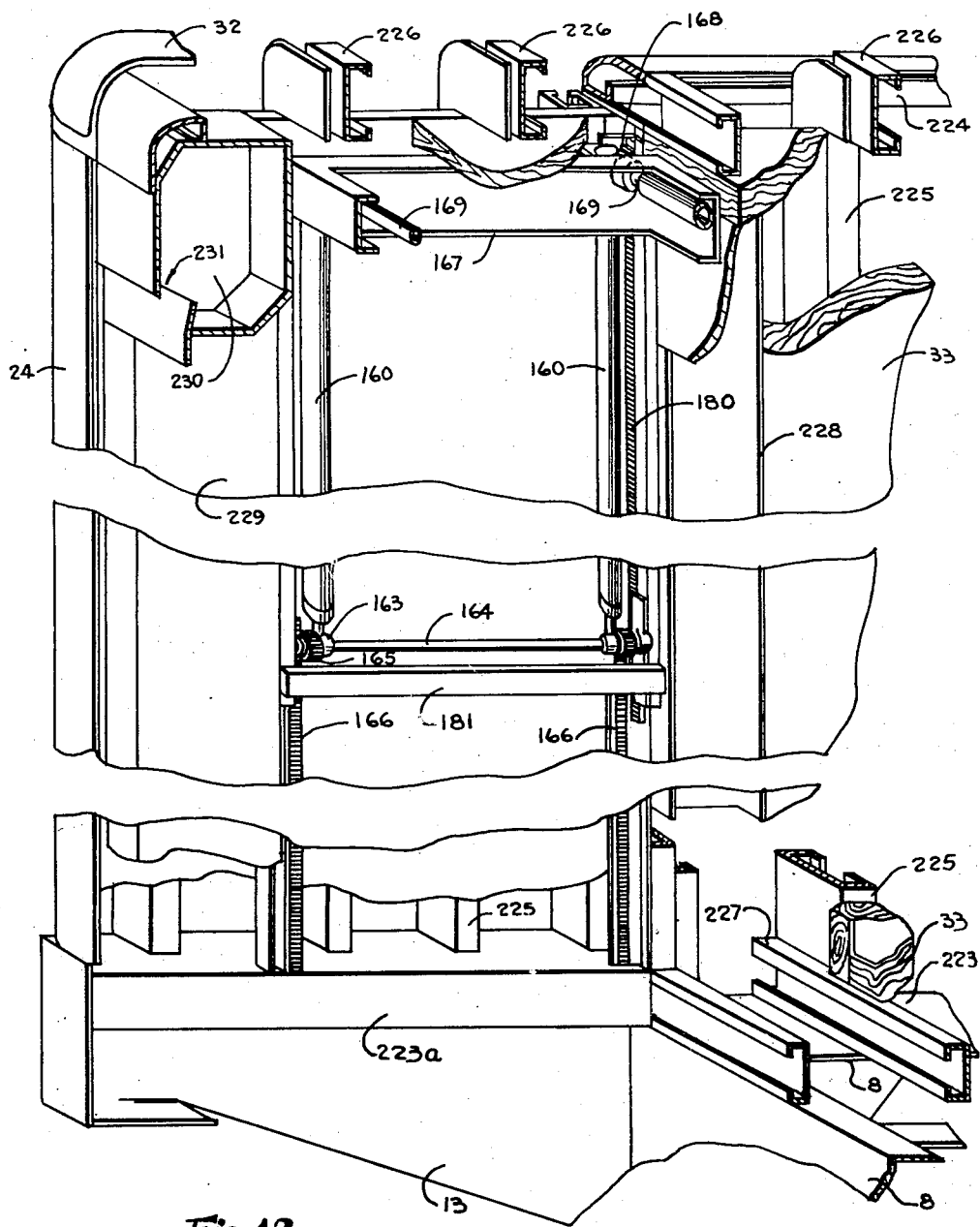

Figure 12 is a side elevation partially in perspective and partially in cross section of the construction of that portion of the rear end of the vehicle which houses the elevator.

Figure 13:
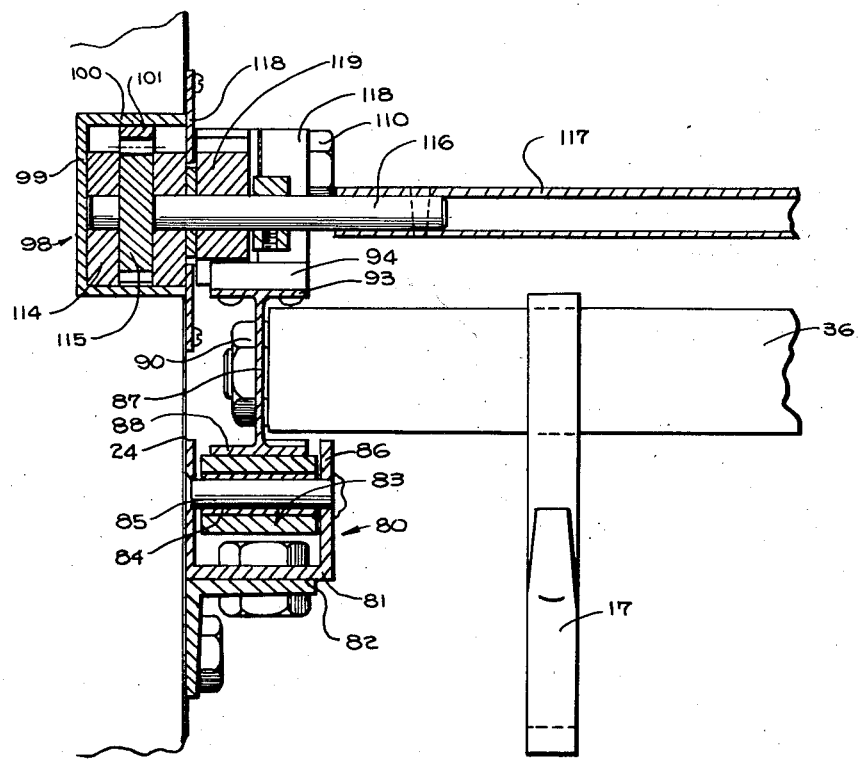

Figure 13 is a cross sectional fragmentary side elevation of the assembly for supporting and guiding the cross arms utilized in supporting perishable foods, such as meat, from adjacent the top of the vehicle. It will be understood with relation to Figure 13 that this figure illustrates but one end of the assembly shown and that the opposite end is constructed with equivalent or corresponding elements.

Figure 14:
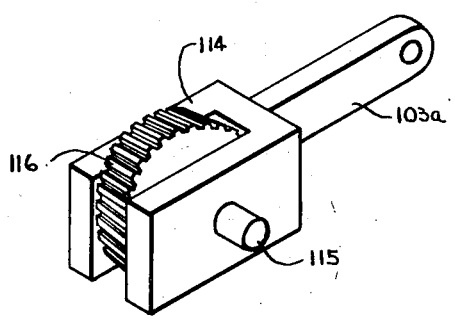

Figure 14 is a detail in perspective of a saddle or shoe which connects one of the hydraulic piston rods with an appropriate gear and rack assembly.

Figure 15 is a side elevation partially in cross section and broken to show but two transverse shafts and meat supporting hooks; preferably but not necessarily each unit as disclosed in Figure 15 contains four of the transverse shafts and each unit of four is provided with coupling means and stops in association therewith.

Figure 16 shows a fragment of one end of the supporting unit; the view being in cross section as taken along the line 16, 16 of Figure 15. It will be understood that the opposite end, undisclosed in Figure 16, contains corresponding or identical elements.

Figure 17 is a side elevational, detail view, in cross section, of a hydraulic actuating cylinder and associated rack and gear assembly.

Figure 18 is a detailed cross sectional view taken along the lines 18, 18 of Figure 17.

Figure 19:
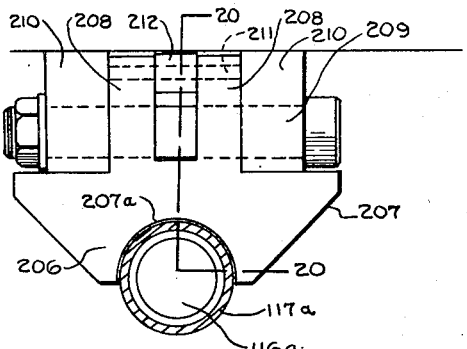

Figure 19 shows a detail of a latch utilized in the elevator to immobilize one of the transverse shaft meat-supporting units.

Figure 20:
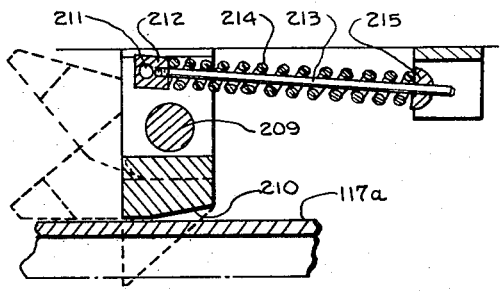

Figure 20 shows a cross section of this latch as viewed along the line 20, 20 of Figure 19 together with a restraining spring utilized in conjunction therewith.

Figure 21:
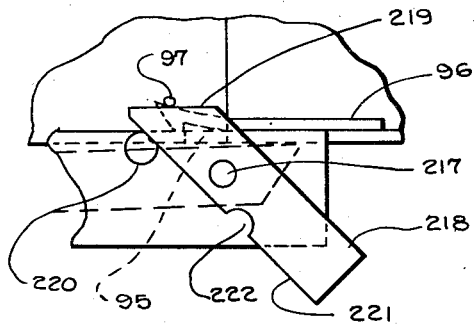

Figure 21 shows a detail of a trip utilized to uncouple a unit of transverse shafts when such unit has been moved into the elevator compartment.

Figure 22:
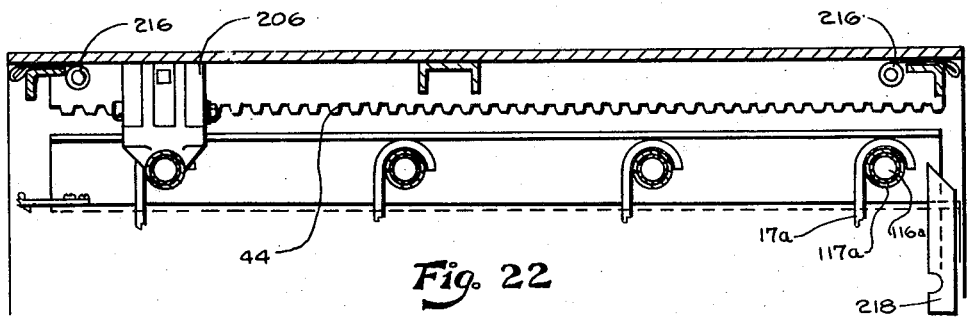

Figure 22 shows in cross section a side elevational view of the relation of the latch disclosed in Figures 19 and 20 and the trip disclosed in Figure 21.

Figure 23 shows diagrammatically a side elevational view of the latching means utilized to move a train of coupled units of meat-supporting hooks from the forward portion of the vehicle toward the elevator compartment at the rear of the vehicle as well as in the opposite direction together with cooperating trips, and stops the purposes and uses of which will be hereafter more fully described.

Figure 24 discloses a corresponding arrangement of latches and trips, partially in cross section, as utilized on the floor of the vehicle, the operation and purposes of which will be hereafter more fully described.

Figure 25 is a diagrammatic conventional arrangement of the valves and hydraulic system utilized in the operation of all hydraulically actuated elements of my invention.

Referring now with more particularity to the individual figures of the drawings, in Figure 1 there is shown a vertical cross sectional representation of one type of vehicle adapted to embody my invention. In the representation shown in the Figure 1 the vehicle appears as a trailer adapted to be motivated by the usual internal combustion or diesel powered tractor. It is, however, within the contemplation of my invention to have my vehicle self-powered and provided with a customary front end suspension. In Figure 1, reference numeral 1 represents generally the insulated vehicle provided with roof 2, floor 3, front end 4 and rear end 5. Rear end 5 is adapted to be opened at will or closed at will by means of a suitable screen, or door, or door assembly 6. The main body of the vehicle is supported upon a chossis 8 which, in turn, is suitably supported by the necessary number of wheels 9 provided with suitable spring suspensions, not shown. Depending from the chassis and extending therebeneath at a suitable location and of a suitable size is a compartment 10, the purpose of which will hereinafter be explained more in detail.

11 is used to designate generally the interior of that portion of the vehicle utilized as a primary compartment and 12 designates a secondary or elevator compartment disposed at the rear of the vehicle and, as will be observed, covered over by an unbroken extension of the roof 2. The secondary compartment is suitably supported at each side thereof by a frame 13, representatively shown at 13 in Figure 1 (also Figure 4b) and shown in more detail in Figure 12. Not shown in Figure 1 but partially shown in Figures 2 and 3 are the sides of the vehicle 24, which, similar to the roof, extend from the front of the vehicle embracing the primary compartment 11 and continuing unbrokenly to the rear end of the vehicle so as to form the sides of the secondary compartment 12.

Disposed adjacent both the roof of the primary compartment and likewise the secondary compartment is an assembly 14 (shown in greater detail in other figures of the drawings) for supporting perishable commodities such as meat. Adjacent the bottom of the vehicle is an assembly 15 (shown in more detail in other figures of the drawings) for supporting a plurality of packaged containers for perishable commodities. The upper assembly support 14 is provided with a plurality of shafts which extend transversely across the interior of the vehicle and from each of which depend a plurality of hooks 17 from which perishable commodities such as sides or carcasses of meat 18 may be suspended. Supported on the floor assembly 15 are a plurality of containers 19. Adapted to be interposed between the primary compartment 11 and secondary or elevator compartment 12 is a moveable door or partition 7 adapted to be elevated or lowered when motivated by a shaft 20 under the influence of the hydraulic unit 21. Disposed within the secondary compartment 12 is an elevator and removable case or enclosure 22, the floor of which, in conjunction with the secondary compartment side and base supports, closes off the bottom of the secondary compartment 12 when the elevator is in fully-elevated position. Some of the elements and particularly those adjacent the rear end of the vehicle heretofore described with relation to Figure 1 are shown in greater detail in Figures 2 and 3 which show in partial perspective the outlines and appearance of the rear end of the vehicle when the elevator 22 has been lowered (in these views to rest on the ground) and the doors 6 opened so as to give access to the commodities disposed within the elevator. In the drawing shown in Figure 2 the door is a slat or roll type door or screen, the details of construction of which are well known and which may be made of metal or other material. In Figure 3 an alternate arrangement of doors is shown wherein a plurality of hinged doors, likewise referred to as 6, is utilized.

Referring now to Figures 4a and 4b, which as hereinabove stated are designed to be read compositely and when placed in juxtaposition, elements shown in conventional outline in Figure 1 are shown in more detail. The roof 2 is shown as formed in a 3-ply construction, an outer skin of metal 32, an inner lining of wood 34 and an intermediate ply shown representatively as 33. With reference to Figure 12 which shows the frame construction in greater detail it may be stated while discussing Figures 4a and 4b that the roof frame is actually formed of a series of horizontal channel members extending longitudinally and transversely so as to provide a frame and cross members which, in turn, are supported by vertical channel members. This metal skeleton is enclosed between the outer skin 32 and the wood lining 34 and all voids between the skin, lining and skeleton are filled with insulating material 33. The floor, front end, and sides of the vehicle are likewise so constructed, and insulated. Supported on the assembly 14 adjacent to but spaced from the roof 12, it being understood that 14 comprises a track disposed at each side of the vehicle and that each track is provided with suitable rollers or frictionless skids, is a series of commodity supporting units 35. As shown in Figures 4a and 4b these consist of a pair of longitudinally disposed frames crossed transversely by a plurality of, preferably four, horizontally disposed shafts 36, each shaft being adapted to support one or more depending hooks 17. Each of the units 35 is provided with coupling means 37 for coupling the unit to an adjacent unit 35. Adjacent the floor of the vehicle and supported on equivalent units 15 which is a track disposed at each side of the vehicle, the tracks being provided with suitable rollers or frictionless skids, is a plurality of analogous units 55, each adapted to support one or more containers 19 and each adapted to be coupled to an adjacent unit 55 by means of a coupler 57.

Through the influence of hydraulic pressure supplied by pipe 41 acting upon a hydraulic cylinder 42 the piston of which is operatively connected with a gear 43 and rack 44 there is provided means for moving all or a selected number of the coupled units 35 rearwardly or forwardly with respect to the vehicle. Similarly, under the influence of hydraulic pressure supplied by pipe 51 connected with hydraulic cylinder 52 the piston and shaft of which operatively connect with gear 53 and a rack 54 (not shown in Figure 4b) there is provided means for moving all or a selected number of the coupled units 55 rearwardly or forwardly with respect to the vehicle.

Within the compartment 10 is provided a vertical partition 39 and a plurality of supporting horizontal ledges 40 upon which may be placed spare or empty commodity-supporting units 35 or spare or empty containers 19. A suitable refrigerating unit may be disposed anywhere deemed desirable; that is, either at the front end of the vehicle, or beneath it, or within the compartment 10. Such refrigeration may be supplied by a refrigerant including ice or solid carbon dioxide or it may contain a complete system for refrigeration by means of a compressor adapted to compress a fluid refrigerant and utilize the refrigerating effect of such system, all in a manner well known. Adjacent the rear end of the primary compartment 11, as shown on Figure 4b is a hydraulic cylinder and associated connections 58. This hydraulic unit is provided for the compression of the door 7 when in lowered position to effect sealing and insulation of the compartment 11. Depending from the bottom of the elevator base 23 are one or more sets of wheels or castors provided to permit easy movement of the elevator when it is desired to remove it from the secondary compartment 12.

Referring now in detail to the construction of the forward portion of the vehicle and the arrangement of the elements therein, the commodity carriers are supported by a pair of tracks disposed adjacent the roof and secured to the side walls of the vehicle. The tracks comprise channel-shaped members 80 the web portion 81 of each of which is bolted or riveted to a flange 82 which is, in turn, bolted or riveted to the side wall 24 of the vehicle. A plurality of rollers 83 having bearings 84 are supported on shafts 85 extending transversely and horizontally between the flange portions 82. The commodity carriers comprise frame members formed of pairs of I-beams 87, the lowermost flanges 88 of which rest upon the rollers 83. Opposed pairs of I-beam members 87 are connected by two or more shafts 36a, the ends of which are threaded. The shafts 36a extend through openings provided in the webs 89 of the I-beam members 87 and are secured thereto by pairs of lock nuts 90—90 which also serve to provide the proper spaced relationship between opposed I-beam members. Each shaft 36a is surrounded with a metal tube 91 which may be either circular or square in cross-section. The tubes 91 are mounted on split wooden fillers 92 which rotate on the shafts 36a and serve as bearings. A plurality of hooks 17 are suspended from the tubes 91 and are adapted to engage the latter frictionally. The uppermost surface of the upper flanges 93 of the I-beam members 87 are provided with lugs 94 which may be riveted or otherwise secured thereto. The lugs 94 on each of the I-beam members 87 are transversely aligned for reason more fully explained in the description of the means for moving said commodity carriers. The uppermost face of the lower flange 88 of each I-beam member remote with respect to the side wall of the vehicle is provided with a keeper 95. The keepers 95 are secured to the I-beams 87 adjacent the ends thereof normally positioned toward the front of the vehicle. A latch 96 having a cross-pin 97 welded thereto is secured to the uppermost face of the lower flange 88 of each I-beam 87 adjacent the side wall of the vehicle. The latches 96—96 on each I-beam member 87 are located at the ends thereof normally positioned toward the rear of the vehicle and are adapted to engage the keepers 95 on the adjoining commodity carrier thereby securing the carriers to one another.

The commodity carrier moving means which is adapted to advance or retract the carriers on the tracks 14 are preferably located within elongated recesses 98 formed in the side walls of the vehicle at the rear end of the vehicle and located immediately above the tracks 14. The recesses are lined with channel members 99 the lowermost faces of the upper flanges 100 of which are provided with racks 101. Positioned within each lined recess is a hydraulic cylinder such as 42 containing a fluid operable piston 102 and a piston rod 103. The cylinder is internally threaded at each end and the end thereof adjacent the forward end of the track is provided with a head 104 which is tapped at 105 to admit an operating fluid from pipe 41. The opposite end of the cylinder is provided with a head 106, a portion of which is shaped to conform with the lined recess and tapped at 107 to admit operating fluid to the other face of the piston. The head 106 is provided with openings 108—109 through which bolts 110 and 111 may extend to secure the hydraulic cylinder to the side wall of the vehicle. The piston rod 103 extends through the head 106 and a cap 112 which is secured to the head 106 and adapted to compress a packing ring 113. The free end of the piston rod 103 is secured to a saddle 114 adapted to reciprocate in the lined recess. A gear 115 is rotatably mounted on a stub shaft 116 between the fingers of the saddle. The gear 115 is adapted to engage the rack 101 in the lined recess. The stub shafts 116 are connected by a hollow shaft 117 and keyed thereto for the purpose of coordinating the movement of the carrier actuating means on each side wall. Upper and lower guides are formed by a slotted plate 118 secured to the side wall of the vehicle which is adapted to extend over a portion of the recess.

The stub shaft 116 upon which the gear 115 is mounted supports a lever 119 provided with carrier lug engaging projections 120 and 121 and a trip 122. A gravity operated stop 123 is pivotally mounted on the bolt 110 extending through the head 106 of the hydraulic cylinder. Mounted on the side wall above the slotted plate 118 is a housing 124 having a spring 125 secured therein. A catch 126 is attached to the lowermost end of the spring 125 and is adapted for vertical movement within the housing 124. The leading edge 127 of the catch facing the forward end of the vehicle is vertical while the trailing edge 128 is beveled. A second similarly constructed catch 129 with its vertical leading edge 130 facing the rear of the vehicle and its beveled trailing edge 131 facing toward the front of the vehicle is also secured in a housing 132 containing a spring 133 to the side wall. The lever 119 is moved rearwardly by the hydraulic cylinder. As the trip 122 on the lever 119 meets the leading edge 127 of the catch 126 the lever 119 rotates until the projection 120 engages the carrier lug 94. Continued movement of the hydraulic cylinder advances the string of carriers toward the rear of the track and finally moves the end carrier into the elevator. As the lever 119 passes the second catch 129 it engages the beveled edge 131 thereof forcing the catch 129 upwardly. The end carrier is disengaged from the string by means hereinafter described and the piston rod 103 is then moved towards its original position. During this movement the trip 122 engages the leading edge 130 of the second catch 129 which rotates the lever 119 until the projection 121 engages the lug 94 of the carrier which moved into the position formerly occupied by the carrier now in the elevator. The carrier which moved into position as described passed under the stop 123 which was raised by the lug 94 on the carrier and then allowed to drop by gravity. The lever 119 having engaged the carrier lug 94 in its return now forces the entire string toward the forward end of the vehicle until the carrier lug 94 engages the stop 123. Upon completion of the foregoing cycle the space between the elevator compartment and the main compartment of the vehicle is free to allow the rear opening of the main compartment of the vehicle to be closed by the door 7.

The floor of the forward section of the vehicle is provided with channel-shaped tracks 15 corresponding to tracks 14 which are also provided with rollers 134 of the same or similar construction to those (83) mounted in the tracks 14. A string of collapsible containers mounted on I-beam skids 55 constructed in the same or an equivalent manner to the I-beam frames 87 are supported by the rollers 134 in the tracks 15. The lowermost face 137 of the upper flange of each I-beam 136 is provided with keepers 138 similar to those (94) described in connection with the commodity carriers.

Levers 139 generally similar to the lever 119 and likewise provided with keeper engaging projections 141 and 142 and trips 143 are mounted on bolts 140 which are operatively connected with the piston head (not shown) of the piston of the hydraulic cylinder 52. Suitably attached to the lower flange of each I-beam 136 are housings 144 (only one of which is shown in Figure 24) which houses a spring 145 and trip 146. The leading or forward edge 147 of the trip 146 is vertical while the rear edge 148 of the trip 146 is beveled. Appropriately disposed at a position somewhat further toward the rear of the vehicle is a second trip 149 the leading or front edge 151 of which is beveled and the rear edge 150 is vertical. The rearward movement of the piston of cylinder 52 will move the piston head and the associated bolt 140 which will carry rearwardly the lever 139 until its trip 143 engages the leading edge of the catch 146. Partial rotation of the lever 139 will ensue until its projection 142 engages the forward edge of the keeper 138. Continued rearward movement will depress the spring 145 and the catch 146 and still further continued movement will depress the catch 149. At this point the I-beam skid assembly 135 which is rearmost in the chain of coupled assemblies will have completely entered the elevator 22 and will have become uncoupled as heretofore and hereafter described.

Thereafter, the direction of flow of the hydraulic fluid is reversed and under the influence of hydraulic pressure the piston of cylinder 52 is moved in a direction toward the front of the vehicle. This will carry with it the lever 139, which in its initial movement will be in the position shown at D in Figure 24, until the trip 143 thereof contacts the rear face of the catch 149. Partial rotation of lever 139 will result until it assumes a position shown as C in Figure 24. Thereafter, continued forward movement of the lever will depress the catch 149 and movement to the front will further continue until after lever 139 has passed over the forward edge 147 of catch 146. Movement of the lever will, because of the operative influence of the projection 141 against the keeper 138, result in forward movement of the entire train of skids 135. This movement will continue until keeper 138 contacts the topmost and stop portion of lever 152. The function of lever 152 is the same as that of lever 123, it is generally disposed in a manner similar to that of 123 but it may require spring restraining means to insure its functioning in its elevated position for proper engagement of keeper 138. It should be understood that any spring employed should be so tensioned as to permit elevation of the lever when a keeper 138 is moved past it from the front of the vehicle.

With reference now to the partition 7 shown in Figure 4b as in the fully elevated position and shown in Figure 1 as in the fully lowered position, the details of this partition and its mode of operation will be understood by referring to Figures 7 to 11 inclusive, of the drawings. Partition 7 is formed of a series of hinged units 184. Each individual unit is formed of a wooden slat 185 affixed to a metal plate 186 by means of suitable rivets or pins 187 in the metal plates. Each metal plate 186 is adapted to be coupled to the adjacent plate by means of hinge pins 189 inserted in hinge slots in a well known manner. Affixed to one edge of each wooden slat is a compressible insulating material which may be of rubber, felt or any other material which possesses the properties of compressibility and of acting as an insulating medium. The topmost or end unit 184 is bolted or otherwise suitably connected to an angle plate 196 in the end edges of which are drilled openings for a shaft 197 upon which a gear 198 is centered. The teeth of the gear coact with the teeth 199 of a rack plate 200 which is suitably affixed to the upper side wall of the vehicle. Extending beyond the gear 198 the end of the shaft 197 is housed in a block or saddle 201 which is fully enclosed in a suitable track formed of a channel having an upper flange 202 and a lower flange 203. Adjacent the inward edges of the upper flange 202 is another angle 204 which is connected to provide a cover for the block 201 and to restrain its movement within the track formed by the said track. A suitable cover 205 may be affixed to the angle 204 to depend over and cover the track formed as described above. Likewise within this track is installed a hydraulic cylinder 21 having a shaft 20, the end of which is fixedly attached to the block 201 so as to impart motion to the block and its related gear under the influence of hydraulic pressure. The shaft 197 may desirably be a stub shaft to which is affixed, by a suitable pin, a hollow shaft extending over to the opposite side of the vehicle for connection with and simultaneous operation of an equivalent hydraulic cylinder and gear and rack assembly. Rearward movement of the shaft 20 of the piston is imparted to the door 7 causing it to move first in a horizontal direction then to slide over a suitable bearing block 64 the upper surface of which is curved to supply a smooth and relatively frictionless surface which will permit a change of direction of 90° in the direction of movement of the elements of the door 7. On the lowermost slat of the door 7 is a somewhat larger insulating strip 190a adapted not only to provide insulation but a greater degree of cushioning of the downward movement of the door 7.

The side edges of the door 7, that is, the side edges of each of the individual units 184, travel, in their vertical movement within a recess formed by the channel 69, the outer flanges 194 of which extend inwardly a short distance from the vertical side walls of the vehicle. Adjacent the floor and affixed to the chassis of the vehicle on each side thereof is hydraulic cylinder 58 the shaft of which 66 is connected with a link and collar 67 to a vertical shaft 68 which is provided with suitable bearing blocks and collars 69a all housed within the channel 69. Attached to the vertical shaft 68 at a desired number of places are cams 190 the surfaces of which contact with a pair of shoes 191 and 192. Vertically disposed adjacent these shoes is channel member 193 the side flanges of which embrace and restrain a suitable compressible insulating strip 70. The shoe 192 bears against the adjacent surface of the web of the channel 193 which extends vertically at least as high as the top of door 7 when in its fully lowered position. Thus, upon operation of the cam 190 to compress the insulating strip 70 it is forced against the edges of the door 7, in turn forcing it against the flanges 194 and continued movement of the cam compresses the insulation so as to make a tight seal around the entire periphery of the door.

Within the elevator compartment and adjacent the roof of the elevator 22 in a position to contact and stop the rearmost commodity-carrying shaft 36a (or 116a) of a unit of such shafts is a plurality of latch or stop assemblies generally referred to as 206. Referring now to Figures 19 and 20 of the drawings the latch 206 has a lower portion provided with beveled outside ears 207 and a recessed portion 207a adapted to embrace and fit over the upper half of the shaft 116a. Integral with the lower portion of the latch are a pair of arms or fins 208 which are bored to accommodate a hinge bolt 209 and to cooperate with a pair of vertical suspended fins. Between the vertical fins 208 and supported in bores drilled therethrough is a shaft 211 upon which is placed a thrust block 212 in one portion of which is counter sunk a suitable rod 213 which is capped with a cap or shoe 215 in order to restrain under some compression a coiled spring 214. The latches 206 are disposed with their major axes parallel to the major axes of the vehicle itself and are adapted to rotate around a pivot point within a plane transverse to the major axis of the vehicle.

As the rearmost transverse meat-supporting shaft 36a (or 116a) moves to the rear of the elevator compartment, its rearmost edge meets the leading edge 207 of the catch 206, the beveled edge permits the catch 206 to be swung on its pivot shaft 209 and progressively to assume the first (left) dotted position shown in Figure 20. This pivotal movement is opposed by spring 214 which tends to return the catch 206 to its normal position. The return to the normal position is accomplished when the transverse shaft 116a is centered under the catch 206 and nestled within the recess 207a between the two ears of the catch. It will be understood that a plurality of such catches 206 are disposed within the elevator compartment and the combined effect of the plurality of catches is to fix the transverse shaft against further horizontal movement. The catches may be released manually or may be forced into the uppermost neutral position (shown in the upper dotted lines on Figure 20) during loading operation of the vehicle.

After the unit of meat-supporting racks with the plurality of transverse shafts 36a has been located in the elevator compartment the partition door 7 will desirably be lowered and closed in order to seal off the main compartment of the vehicle prior to opening any doors leading into the elevator compartment. The coupling between each string of meat-supporting units will, as respects the rearmost unit and its next adjacent unit, prevent the lowering of the door 7 unless the units are uncoupled at this point. To provide an automatic uncoupling, lever 218 is pivotally supported on a pivot shaft or bolt 217 disposed adjacent each roller track and immediately to the rear of the partition door 7. Normally the lever 218 assumes a free vertical position as shown in Figure 22, but as the meat-supporting unit moves toward the rear, the upper beveled surface 219 of the lever 218 is engaged by a stop 97 and rotated about pivot 217 of the lever, meets a fixed stop 220 which prevents further rotation of the lever. Further rearward movement of the meat-supporting unit is accomplished only by a slight elevation of the rear end of the unit caused by the co-action between the beveled face 219 and the stop 97 which results in the uncoupling of the unit from the next most forward unit in the train. Separation of the uncoupled unit now firmly fixed within the elevator by virtue of the catches 206, from the balance of the train will follow when the hydraulic flow in cylinders 42 is reversed. This reverse flow imparts a forward motion to the entire train of coupled meat-supporting units to a point which will clear the path of the partition door 7 in the manner heretofore described. The uncoupled rearmost meat-supporting units will now be located in the elevator 22 in compartment 12 and in the position shown in Figures 4B and 22. Adjacent the top of Figure 22 are a pair of roll type curtains 216 to provide further insulating seal within the elevator. These curtains, which may be pulled down at will, provide protection and insulation for the contents of elevator 22 when it is detached from the compartment 12. Similar uncoupling levers with attendant stops are provided on the floor skid track to provide uncoupling of the rearmost container-supporting unit from the remainder of the floor train.

Referring now to Figures 5, 6 and 12 which show in more detail the elevator compartment 12 and the elevator lowering and elevating assembly, 8 is a fragment of the plates which comprise the vehicle chassis. Numeral 13 is a bracket, one of which extends rearwardly of the main chassis of the vehicle on each side of the elevator compartment and serves as a foundation for the side-wall of the elevator compartment. Disposed on the chassis and along each side edge of the floor of the primary compartment of the vehicle is a plate 223; and disposed along each side edge of the roof of the main compartment of the vehicle is an analogous plate 224. Roof plates 224 extend to the rear edge 24 of the elevator compartment. Plates 223 as extended by brackets 13 support blocks 223a. At spaced intervals vertical channel members 225 are suitably bolted or riveted to tie in plates 223 and 224 or 223a and 224 and to provide the vertical side wall framework of each side of the primary compartment and of the elevator compartment. Horizontal angle bars or channel members 226 are suitably bolted or riveted to provide the roof rafter framework for both the primary and elevator compartments. Analogous angles or channels 227 are horizontally disposed across the floor only of the primary compartment to provide the foundation for the floor of the vehicle, that is, only the floor of the primary compartment. As heretofore described, the roof and sides of the vehicle are sheathed over with a metal skin 32 and the interstices or voids between the roof skeleton and the roof skin (and the side wall skeleton and the side wall skin) are filled with insulating material 33. Supporting the bottom edges of the insulating material on the roof of the vehicle is an additional metal skin 34 and on the floor of a vehicle is a wood flooring. Vertically disposed at each side of the rear end of the primary compartment is a channel 228 which provides the housing for the side wall edges of the partition door 7 and its sealing mechanism heretofore described in detail. The rearmost flange of the channel 228 also provides a partial, peripheral partition between the primary compartment and the elevator compartment. Likewise, vertically disposed at the rearmost corners on each side of the elevator compartment is another channel 229 which provides a recess or housing for hydraulic valves and hydraulic pipe linkages. Horizontally disposed within this vertical compartment formed by the channels 229 and lying transversely across the rear of the elevator compartment and adjacent the interior roof thereof, is another compartment 230 which may house the elevator compartment door 6 (when a roll type or screen type door is used) and which also houses the screen roll 46 upon which the roll door may be rolled up when in elevated position.

Disposed adjacent the interior and opposing flanges of the channels 229 and 228 on each side of the elevator compartment are racks 180 which cooperate with gears 168 which, in turn, are affixed on horizontal transverse shafts 169. The shafts 169 may be stub shafts which are suitably keyed or otherwise affixed to hollow tube shafts for initial adjustment and consequential adjusted rotation of each pair of gears on both sides of the chamber. The gears 168 and associated racks 180 function as centering tracks to permit free and uniform elevation or lowering of the elevator frame. Supported by the shafts 169 by suitable collars 170 thereon is a frame 167 formed of four horizontal angle members which form a rectangular roof support frame for the elevator. Suitably disposed below the angle frames 167 are horizontal plates or bars 181 which are bolted or riveted to vertical angle members or plates 167a so as to form a complete and integral elevator skeleton which may be lowered or elevated as a unit.

Adjacent each side wall of the elevator compartment and having their upper ends fixedly attached, as for example, to the roof plates 224, are two hydraulic cylinders 160, the shafts of which 171 are attached through collars 163 to a horizontal shaft 164. At each end of the horizontal shafts 164 are provided gears 165 which mesh with and co-act with vertically disposed racks 166. The exterior ends of the shafts 164 are set into suitable bearings on the vertical plates 167a connecting roof members 167 and floor plates 181 of the elevator. Movement of the piston of the cylinder 160 is imparted to the shaft 164 and thence to the elevator framework formed by 167, 167a and 181.

Supported by means of the lower ledge or plates 181 through the medium of a bar 182 which extends peripherally around the two sides and, if desired, the rear, is the elevator 22. This is the detachable enclosure which I have shown elsewhere in Figures 2 and 3 as being provided with casters or wheels. This elevator has affixed to its roof the extensions of the track, the latching means 206 and the various supports for the roof meat-supporting units 36 and the floor container units 19 heretofore described in more detail.

It is contemplated that the elevator 22 may be detached from the elevating framework formed by 167, 167a and 181, and where desired, wheeled from my vehicle into the interior of the store or warehouse for transportation of the suspended meat and other commodities, without requiring manual lifting thereof, and delivered from the elevator 22 directly into a refrigerator in the store. After delivery of the meat and commodities removed from the elevator 22 it may be wheeled back, reinserted into the elevator framework and by reverse movement of the hydraulic cylinders 160 may be elevated to its upper suspended position.

I have shown in Figure 25, purely diagrammatically, the hydraulic control mechanism for the various hydraulic cylinders heretobefore described. Hydraulic pressure through a suitable conduit is applied at E through a check valve 252 and thence as desired to 4-way valves 248, 249, 250 and 251, and also desirably to pilot valves 242, 243, 244, 245, 246 and 247. I prefer to locate pilot valve 242 on the outside rear of the vehicle at a convenient and readily accessible height from the ground. I prefer to mount pilot valves 243, 244, 245, 246 and 247 on an inside wall of the vehicle.

Pilot valve 242 controls the elevator valve system. Pilot valve 243 controls and is therefore connected with hydraulic cylinders 160 which are utilized for raising or lowering the elevator. Pilot valve 244 controls and is therefore connected with hydraulic cylinders 58 which are utilized in actuating the sealing or releasing of door 7 when it has been placed in fully lowered position. Pilot valve 245 is connected to 4-way valve 250 and is preferably utilized to actuate hydraulic cylinders 21 for the purpose of raising or lowering door 7. Pilot valve 245 should never be actuated except when pilot valve 244 is open.

Pilot valve 246 is connected to 4-way valve 249 for the actuation of hydraulic cylinders 42. This valve controls the actuation for the extension and retracting of hydraulic cylinders 42 to impart forward or rearward movement of the roof meat-supporting units 36. Similarly, pilot valve 247 is connected to 4-way valve 248 for the actuating of hydraulic cylinder 52. This valve is actuated for extending and retracting cylinders 52 for the forward or rearward movement of the racks which support the pans 19. Pilot valves 246 and 247 should never be actuated unless door 7 is in its fully elevated position and pilot valves 244, 245, 246 and 247 are normally never operated when the elevator is in any position except the fully raised position.

All pilot valves and 4-way valves are connected by suitable pipe lines to a return line F at the extreme end of which is inserted a relief valve 253 which is adjusted for opening at a pressure somewhat in excess of that to keep the hydraulic system full of fluid. Check valve 252 and relief valve 253 operate to confine sufficient fluid in the system until desired operation of one or more of the pilot valves is accomplished. The system is supplied with fluid maintained under desired pressure from a conventional pump motivated by the conventional power unit and connected thereto with flexible hose.

The operation of my vehicle in one illustrative embodiment is as follows: The vehicle, whether it be self-powered or a tractor-driven trailer, is backed up to a wholesale storage warehouse. Desirably through the medium of a corridor or tarpaulin, (or in some installations wherein a fixed corridor or vestibule would be provided), the elevator compartment door 6 being opened and the partition door 7 being opened to its fully elevated position, the interior of the vehicle would be cooled by direct connection with the interior of the warehouse. After the interior of the vehicle has been pre-cooled to the desired degree, it is ready for loading. The most preliminary step of loading will vary depending with the extent of the auxiliary loading equipment installed at the warehouse. I contemplate that suitably supported rails enclosed in a fixed corridor or enclosed in a tarpaulin, or fabric corridor, will be provided at the warehouse, the ends of the rails being provided with extensions or couplings of the same general over-all construction as the roller skids hereinabove described as provided in my vehicle. With such fixed provision at the storage warehouse individual loading racks or units 36, each provided with the transverse shafts 36a and supported meat hooks 17 may be rolled directly from the storage warehouse through the corridor and into the elevator compartment of the vehicle. It will be understood, of course, that all catches and stops heretofore described as located within the vehicle will have been placed in elevated or neutral position, the partition door 7 will have been elevated to its uppermost position and the elevator will, of course, be in its "up" or topmost position. Carcasses or semi-carcasses or sides or quarters of meat either frozen or chilled to the desired degree and having been impaled on the hooks 17 are then pushed along the auxiliary tracks in the warehouse into the elevator compartment and thence are pushed into the primary compartment of the vehicle.

I contemplate that each increment of suspended meat will be loaded into the vehicle in inverse order to the anticipated withdrawal of such increment. Thus, I anticipate that a schedule of deliveries from the truck will be arranged in advance of loading and the loading will be accomplished in inverse order of the deliveries on this schedule. That is to say, that order or increment which is to be last delivered will be the first loaded onto the vehicle and, therefore, will assume a position adjacent the extreme front of the vehicle. The first anticipated delivery will be made of the last increment of meat loaded onto the vehicle and that increment will be suspended on the meat-supporting unit which is located most nearly adjacent the rear of the primary compartment and, of course, most nearly adjacent the partition door 7. Stated slightly differently, the order of delivery will be "last on, first off" or "first on, last off."

I contemplate further that in addition to the suspended commodities which possess considerable bulk, other less bulky commodities such as frozen, chilled or cooled meat, or eggs, milk, fresh vegetables, frozen vegetables and, in fact, any commodity which it is desired to transport fresh or in a cold, chilled or frozen condition, may be packed as ordered in one or more of the collapsible containers 19. As in the case of the carcasses or sides of meat, the containers 19 will be loaded onto the floor track or skid units in inverse order to the anticipated withdrawal and delivery thereof. That is to say, "first on, last off" or "last on, first off."

It will be apparent that if the meat-supporting units or the container-supporting units have been rolled onto and into the primary compartment of the vehicle individually, each unit will be pushed or forced against the immediately adjacent forward unit sufficiently firmly to insure the engagement of the coupling between the two units. Alternatively, the individual units may be coupled within the warehouse and rolled through the corridor into the vehicle as a complete train of coupled units. After the primary compartment of the vehicle has been fully loaded all stops and latches are changed from neutral to operative position and the partition door 7 is lowered to its lowermost position under the actuating influence of hydraulic cylinders 21. Thereafter, under the influence of the appropriate pilot valve 244 hydraulic cylinders 58 are actuated to seal the peripheral insulation around the margin of door 7. Normally no commodity will be permitted to remain within the elevator compartment or on the elevator at this stage. Partition door 7 having been lowered and sealed, the elevator compartment door 6 may be rolled down as by means of crank 183 or manually if desired or if the vehicle is provided with one or more hinged end doors these doors may be closed and suitably latched. Thereafter the vehicle is moved away from the corridor or vestibule and is in readiness to proceed on its prearranged schedule of deliveries.

Upon arriving at a delivery point where it is desired to deliver an order, or an increment of the commodity being transported, which commodities have been loaded as indicated above, the vehicle is backed adjacent the delivery point and stopped. The vehicle operator or his assistant operates pilot valve 244 so as to actuate cylinders 58 to unseal door 7. Pilot valve 245 is then operated so as to actuate cylinders 21 to elevate door 7 to its overhead or inoperative position. The elevation of door 7 thus opens the passage-way between the primary compartment and the elevator compartment. Preferably all of the foregoing operations are performed without opening any doors leading to the elevator compartment and with the elevator in its "up" or fully raised position. Thereupon either or both of pilot valves 246 and 247 are turned to actuate either or both of the sets of hydraulic cylinders 42 and 52 in order to move the remaining coupled roof units or floor units toward the rear. Rearward movement of these units or either of them as desired is continued until the rearmost unit in either or both trains is uncoupled through the operation of the automatic uncoupling means and has been located in position in the elevator compartment through the operation of the catches 206. The aforesaid pilot valves are thereupon moved to actuate either or both of the sets of cylinders 42 and 52 to impart forward movement to the trains of units located either adjacent the roof or the floor of the primary compartment. Forward movement of these trains continues until the movement is arrested by means of the levers, trips and stops heretofore described in detail with reference to Figures 22, 23 and 24. The arresting of the forward movement at this point and through these means clears the space to be occupied by the partition door 7 and permits it to be lowered. Pilot valve 245 is then operated to actuate hydraulic cylinder 21 in order to lower door 7; when the door has reached its lowermost position pilot valve 244 is then operated to actuate cylinders 58 in order to impress the sealing and insulation means against door 7 and completely seal and insulate the primary compartment.

When the primary compartment has been so sealed and insulated, pilot valve 243 is then moved to actuate hydraulic cylinders 160 in order to lower the elevator and permit the elevator 22 to be placed on or adjacent the ground or on or adjacent a suitable platform. Door 6 is then elevated or opened to permit access to the interior of the secondary compartment 12 and elevator 22 and specifically to permit access to the commodities which are enclosed within and supported by or in the elevator 22. If a very small order is being delivered, the amount being insufficient to empty the elevator compartment, that portion of the contents of the compartment which it is desired to deliver may be manually removed and carried into the store or other place of delivery. The same applies to deliveries of but one or few of the floor containers 19. If, however, the entire contents of the elevator compartment are to be delivered, the compartment 22 may be rolled out of the elevator frame and wheeled into the store for prompt and relatively effortless delivery of the commodities from the compartment to the store refrigerator wherever located at the point of delivery.

Upon completing the delivery the compartment is wheeled back into place within the encompassing elevator framework. Desirably the door 6 is lowered (for a partial delivery from the compartment the door is desirably lowered while the commodities are being carried into the store or retail establishment thereby avoiding contamination from dust and other contaminants) and through the operation of pilot valve 243 the elevator is raised to its "up" and fully suspended position. If the delivery at the adjacent point of discharge has emptied the contents of the elevator compartment the meat-supporting units are removed from the elevator compartment and may be placed in the storage compartment 10 on the ledges thereof as shown in Figure 4a of the drawings. Similarly, if the delivery has depleted the contents of one or more of the containers 19, these containers may be folded, removed from the elevator compartment and stored on the ledges thereof in the compartment 10 as illustrated in Figure 4a. In the event that the delivery at the last preceding point has been but a partial delivery of the contents of the elevator compartment and there still remain some commodities either on the roof or the floor of the elevator compartment after door 6 has been closed, door 7 is elevated to open the passage-way between the primary compartment and the elevator compartment. Hydraulic cylinders 42 are actuated in the rearward direction to make contact with and couple the train of units with the unit or frame still remaining in the elevator compartment. Prior to this step and, of course, prior to the closure of the doors of the elevator compartment the trip lever 118 will have been neutralized and the latches 206 will have been neutralized to permit such coupling. Cylinder 42 is then actuated in the forward direction and the entire train of meat-supporting units including the rearmost and now coupled unit is moved forward and into the primary compartment. The same operation is employed with regard to the floor units and their supporting containers 19 simultaneously or alternatively or as desired. Upon completion of the forward movement the rearmost and now coupled meat-supporting unit is brought to stop at a point where its forward motion is arrested by the lever (and stop) arrangement 119. The entire train of meat-supporting units is now immobilized and held in readiness either in fixed position for security during transportation or the cycle of delivery at the next point of discharge. Obviously the cycle of operation for the container supporting units on the floor will be equivalently performed. When all suspended or supported commodities on their fully coupled and immobilized units have entered the primary compartment, door 7 is lowered in the manner aforesaid and sealed and insulated in the manner aforesaid. The vehicle is now ready to proceed to its next point of delivery and for a repetition of the foregoing cycle.

In the foregoing specification I have used several terms and expressions which I wish to define and describe with more particularity. Wherein my specification and claims I have used the word "trackless" with regard to my vehicle I have used it for the purpose of excluding vehicles such as freight cars which move on fixed pairs of rails or tracks. I have made this exclusion not because I believe my invention incapable of adaptation to railroad freight cars, but because I believe that the adaptation will entail certain changes and modifications not only in the individual cars but possibly also in the trackage and points of loading and delivery adjacent to such trackage. Apart from the exclusion of tracked vehicles such as freight cars I have used the work "trackless" as covering and including vehicles which operate on wheels or their equivalent on highways or over any type of terrain over which convention vehicles are capable of traveling. I also utilized the expression "trackless" to include airplanes, the travel of which is not limited by or to a fixed path such as a pair of railroad tracks. It is my opinion that the essential features of my invention may be incorporated within the body of an airplane with reasonable facility.

As stated hereabove, I contemplate that my vehicles, particularly where adapted for traveling on highways, or as a surface vehicle as distinct from airplanes, may be constructed as a truck provided with an integral power plant, either Diesel or internal combustion, or it may be constructed as a trailer adapted to be attached to a tractor which may be either diesel or powered by internal combustion. The principle of my invention may also be applied to trucks of considerably smaller capacity and size such as, for example, half-ton or three-quarter ton trucks or larger if desired.

While I have shown in my explanation of one exemplification of my vehicle, the idea of pre-cooling the insulated primary compartment of the vehicle and its subsequent loading with chilled or frozen commodities which will retain their temperature, I may also provide supplementary means for further cooling and refrigerating the interior of the vehicle. I may accomplish this by the utilization of ice or solid carbon dioxide or other solid refrigerants. I may also utilize an integrated refrigerating system with suitable cooling coils and compression unit which may be either powered by power take-off or by a belt or chain and sprocket, connected with one of the axles of the vehicle all in a conventional and well known manner.

It is believed evident from the foregoing description that my vehicle and my methed of transporting commodities permits incremental deliveries of commodities on long or short hauls in large or small amounts and with no regard to prevailing high temperature atmospheric conditions. Thus, perishable commodities may be transported with a minimum amount of spoilage and individual deliveries are accomplished with the commodities in as fresh and as clean condition as when first loaded at the wholesale warehouse. Furthermore, the provision of the insulating partition between the primary and elevator compartments during delivery insures a maximum degree of cleanliness and a maximum exclusion of dust and other contaminants. Even the increments being removed from my vehicle may be transported from the vehicle into the retail store or other delivery point fully enclosed by the wheeled container and thereby shielded from dust and other contaminants. Other advantages of my invention will be apparent to those skilled in the art.

I claim:

1. In a trackless, mobile, refrigerated vehicle adapted for the transmission of refrigerated perishable commodities, a primary, insulated, forward compartment, a secondary, insulated, rear compartment in communication therewith, a movable partition adapted, when desired, to separate said primary compartment from said secondary compartment or to permit communication therebetween at a common end of said compartments, an elevator adapted to be housed within said secondary compartment, and adapted to be suspended within said secondary compartment or lowered to ground level when desired, an access door in a wall of said secondary compartment other than said common end of said primary and said secondary compartments, a plurality of horizontally movable supporting units for supporting refrigerated, perishable commodities, means for moving a selected number of said supporting units from said primary compartment to said secondary compartment and into said elevator while maintaining the remainder of said supporting units within said primary compartment, and means for closing said partition to seal off said primary compartment.

2. In a trackless, mobile, refrigerated vehicle adapted for the transmission of refrigerated perishable commodities, a primary, insulated, forward compartment, a secondary, insulated, rear compartment in communication therewith, a movable partition adapted, when desired, to separate said primary compartment from said secondary compartment or to permit communication therebetween at a common end of said compartments, an elevator adapted to be housed within said secondary compartment and adapted to reciprocate vertically between an upper suspended position and a lower, ground-level position, an access door in a wall of said secondary compartment other than said common end of said primary and said secondary compartments, a pluraliy of horizontally movable supporting units for supporting refrigerated, perishable commodities, means for moving a selected number of said supporting units from said primary compartment and into said elevator while maintaining the remainder of said supporting units within said primary compartment, and means for closing said partition to seal off said primary compartment.

3. In a trackless, mobile, refrigerated vehicle adapted for the transmission of refrigerated perishable foods, a primary, insulated, forward compartment, a contiguous secondary, insulated, rear compartment, said two compartments having a single vertical, planar, common boundary, a movable partition adapted to seal off said compartments at said common boundary, a closable access port in a wall of said secondary compartment, a plurality of horizontally movable supporting units for supporting, refrigerated, perishable foods, means for moving a selected number of said supporting units from said primary compartment to said secondary compartment through said common boundary while maintaining the remainder of said supporting units within said primary compartment, means for closing said partition to seal off said primary compartment and means for removing supported, refrigerated foods from said secondary compartment without removing said foods from their supporting units.

4. A trackless, mobile, refrigerated vehicle adapted for the transmission of refrigerated perishable foods, comprising a chassis, a body mounted on said chassis, said body comprising a front wall, side walls, a roof, and a floor, all of said elements being insulated and imperforate, said roof and said side walls extending rearwardly beyond the rear end of said floor, the major portions of said roof and said side walls forming, with said floor and said end wall a primary compartment, the minor and extended portions of said roof and side walls forming the roof and sides of a contiguous secondary compartment, a movable vertical partition within the interior of said body and adapted to serve as a movable rear wall for said primary compartment as well as a removable front wall for said secondary compartment, an insulated rear end wall for said secondary compartment, an elevator housed within said secondary compartment, said elevator having a floor which is coextensive with at least part of the floor space of said secondary compartment, said floor being adapted to complete the closing of said secondary compartment when said elevator is in its uppermost position, and means for elevating and lowering said elevator between said uppermost position and ground-level.

5. A trackless, mobile, refrigerated vehicle adapted for the transmission of refrigerated perishable foods, comprising a chassis, a body mounted on said chassis, said body comprising a front wall, side walls, a roof, and a floor, all of said elements being insulated and imperforate, said roof and said side walls extending rearwardly beyond the rear end of said floor, the major portions of said roof and said side walls forming, with said floor and said end wall a primary compartment, the minor and extended portions of said roof and side walls forming the roof and sides of a contiguous secondary compartment, a movable vertical partition within the interior of said body and adapted to serve as a removable rear wall for said primary compartment as well as a removable front wall for said secondary compartment, an insulated rear end wall for said secondary compartment, an elevator housed within said secondary compartment, having a floor which when lowered is adapted to rest on ground-level yet when elevated is adapted to close said secondary compartment, and means for elevating and lowering said elevator.

6. A trackless, mobile, refrigerated vehicle adapted for the transmission of refrigerated perishable foods, comprising a chassis, a body mounted on said chassis, said body comprising a front wall, side walls, a roof, and a floor, all of said elements being insulated and imperforate, said roof and said side walls extending rearwardly beyond the rear end of said floor, the major portions of said roof and said side walls forming, with said floor and said end wall a primary compartment, the minor and extended portions of said roof and side walls forming the roof and sides of a contiguous secondary compartment, a movable vertical partition within the interior of said body and adapted to serve as a removable rear wall for said secondary compartment, as well as a removable front wall for said secondary compartment, an insulated rear end wall for said secondary compartment, an elevator housed within said secondary compartment, having a floor which when lowered is adapted to rest on ground-level yet when elevated is adapted to close said secondary compartment, means for elevating and lowering said elevator, a plurality of tracks disposed adjacent the roof of said primary compartment and of said elevator and a plurality of food supporting units adapted to be supported on said tracks for horizontal movement thereon.

7. A trackless, mobile, refrigerated vehicle adapted for the transmission of refrigerated perishable foods, comprising a chassis, a body mounted on said chassis, said body comprising a front wall, side walls, a roof, and a floor, all of said elements being insulated and imperforate, said roof and said side walls extending rearwardly beyond the rear end of said floor, the major portions of said roof and said side walls forming, with said floor and said end wall a primary compartment, the minor and extended portions of said roof and side walls forming the roof and sides of a contiguous secondary compartment, a movable vertical partition within the interior of said body and adapted to serve as a removable rear wall for said primary compartment as well as a removable front wall for said secondary compartment, an insulated rear end wall for said secondary compartment, an elevator housed within said secondary compartment, having a floor which when lowered is adapted to rest on ground level yet when elevated is adapted to close said secondary compartment, means for elevating and lowering said elevator, a plurality of tracks disposed adjacent the roof of said primary compartment and of said elevator and a plurality of food supporting units adapted to be supported on said tracks for horizontal movement thereon, a plurality of tracks disposed adjacent the floor of said primary compartment and of said elevator and a plurality of food supporting units adapted to be supported on said tracks for horizontal movement thereon.

8. A trackless, mobile, refrigerated vehicle adapted for the transmission of refrigerated perishable foods, comprising a chassis, a body mounted on said chassis, said body comprising a front wall, side walls, a roof, and a floor, all of said elements being insulated and imperforate, said roof and said side walls extending rearwardly beyond the rear end of said floor, the major portions of said roof and said side walls forming, with said floor and said end wall a primary compartment, the minor and extended portions of said roof and side walls forming the roof and sides of a contiguous secondary compartment, a movable vertical partition within the interior of said body and adapted to serve as a removable rear wall for said primary compartment as well as a removable front wall for said secondary compartment, an insulated rear end wall for said secondary compartment, an elevator housed within said secondary compartment, having a floor which when lowered is adapted to rest on ground-level yet when elevated is adapted to close said secondary compartment, means for elevating and lowering said elevator, a plurality of tracks disposed adjacent the floor of said primary compartment and of said elevator and a plurality of food supporting units adapted to be supported on said tracks for horizontal movement thereon.

9. A trackless, mobile, refrigerated vehicle adapted for the transmission of refrigerated perishable foods, comprising a chassis, a body mounted on said chassis, said body comprising a front wall, side walls, a roof, and a floor, all of said elements being insulated and imperforate, said roof and said side walls extending rearwardly beyond the rear end of said floor, the major portions of said roof and said side walls forming, with said floor and said end wall a primary compartment, the minor and extended portions of said roof and side walls forming the roof and sides of a contiguous secondary compartment, a movable vertical partition within the interior of said body and adapted to serve as a removable rear wall for said primary compartment, as well as a removable front wall for said secondary compartment, an insulated rear end wall for said secondary compartment, an elevator housed within said secondary compartment, having a floor which when lowered is adapted to rest on ground-level yet when elevated is adapted to close said secondary compartment, means for elevating and lowering said elevator, a plurality of tracks disposed adjacent the roof of said primary compartment and of said elevator and a plurality of food supporting units adapted to be supported on said tracks for horizontal movement thereon, said supporting units comprising a plurality of frames each adapted to be coupled to contiguous frames for simultaneous horizontal movement of all of said units.

10. A trackless, mobile, refrigerated vehicle adapted for the transmission of refrigerated perishable foods, comprising a chassis, a body mounted on said chassis, said body comprising a front wall, side walls, a roof, and a floor, all of said elements being insulated and imperforate, said roof and said side walls extending rearwardly beyond the rear end of said floor, the major portions of said roof and said side walls forming, with said floor and said end wall a primary compartment, the minor and extended portions of said roof and side walls forming the roof and sides of a contiguous secondary compartment, a movable vertical partition within the interior of said body and adapted to serve as a removable rear wall for said primary compartment as well as a removable front wall for said secondary compartment, an insulated rear end wall for said secondary compartment, an elevator housed within said secondary compartment, having a floor which when lowered is adapted to rest on ground-level yet when elevated is adapted to close said secondary compartment, means for elevating and lowering said elevator, a plurality of tracks disposed adjacent the floor of said primary compartment and of said elevator and a plurality of food supporting units adapted to be supported on said tracks for horizontal movement thereon, said supporting units comprising a plurality of frames each adapted to be coupled to contiguous frames for simultaneous horizontal movement of all of said units.

11. A trackless, mobile, refrigerated vehicle adapted for the transmission of refrigerated perishable foods, comprising a chassis, a body mounted on said chassis, said body comprising a front wall, side walls, a roof, and a floor, all of said elements being insulated and imperforate, said roof and said side walls extending rearwardly beyond the rear end of said floor, the major portions of said roof and said side walls forming, with said floor and said end wall a primary compartment, the minor and extended portions of said roof and side walls forming the roof and sides of a contiguous secondary compartment, a movable vertical partition within the interior of said body and adapted to serve as a removable rear wall for said primary compartment as well as a removable front wall for said secondary compartment, an insulated rear end wall for said secondary compartment, an elevator housed within said secondary compartment, having a floor which when lowered is adapted to rest on ground-level yet when elevated is adapted to close said secondary compartment, means for elevating and lowering said elevator tracks disposed adjacent the roof and the floor of said primary and secondary compartments, a plurality of food supporting roof units supported on said tracks adjacent the roof of said primary compartment and a plurality of food supporting floor units supported on said tracks adjacent the floor of said primary compartment, automatic means for moving said roof units horizontally, forwardly and rearwardly as desired, and automatic means for moving said floor units horizontally, forwardly and rearwardly as desired.

12. The device defined in claim 11 characterized by having means for coupling each of said floor units to adjacent floor units and means for coupling each of said roof units to adjacent roof units whereby all of said roof units may be moved horizontally simultaneously and all of said floor units may be moved horizontally simultaneously, independently of said roof units.

13. The device defined in claim 12 characterized by having means for uncoupling a selected number of rearmost roof and floor units when said units are within the said elevator and when said elevator is in its uppermost position.

14. The device defined in claim 13 characterized by having automatic means for closing the said partition between said primary and said secondary compartments after the said coupled floor units and said coupled roof units have been separated from said uncoupled units and moved forwardly into said primary compartment beyond said partition.

15. The device defined in claim 14 characterized by having means to immobilize said roof units and said floor units within said primary compartment after said partition has been closed to seal said primary compartment.

16. The device defined in claim 11 characterized by having said elevator comprised of an elevator compartment adapted to be raised or lowered within a supporting elevator frame which is housed within said secondary compartment.

17. The device defined in claim 16 wherein said elevator compartment has movable wall enclosures.

18. The device defined in claim 17 wherein said elevator compartment is detachable from said elevator frame, whereby said elevator compartment may be lowered to ground-level and moved thereon independently of any other part of said trackless vehicle.

19. A method of transporting and distributing refrigerated perishable commodities which comprises loading said commodities, while chilled, into a refrigerated zone of a mobile, insulated, refrigerated, trackless vehicle, and supporting said commodities on a plurality of mobile supporting units disposed in said refrigerated zone, sealing off said refrigerated zone, unsealing said refrigerated zone and moving a selected number of said supporting units out of said refrigerated zone and into an elevatable compartment within a secondary delivery zone in said vehicle, resealing said refrigerated zone, depressing said elevatable compartment to adjacent ground-level and removing said selected perishable commodities from said supporting units within said depressed elevatable compartment.

20. A method of transporting and distributing refrigerated perishable commodities which comprises loading said commodities, while chilled, into a refrigerated zone of a mobile, insulated, refrigerated, trackless vehicle, and supporting said commodities on a plurality of mobile supporting units disposed in said refrigerated zone, sealing off said refrigerated zone, unsealing said refrigerated zone and moving a selected number of said supporting units out of said refrigerated zone and into an elevatable compartment within a secondary delivery zone in said vehicle, re-sealing said refrigerated zone, depressing said elevatable compartment to adjacent ground-level while maintaining all sides of said elevatable compartment in closed position, opening a side of said elevatable compartment and removing said selected perishable commodities from said supporting units within said depressed elevatable compartment.

21. A method of transporting and distributing refrigerated perishable foods which comprises loading said foods, while chilled, into a refrigerated zone of an insulated, refrigerated, trackless vehicle, and supporting said foods on a plurality of mobile supporting units disposed adjacent the top and bottom of said refrigerated zone, sealing off said refrigerated zone, unsealing said refrigerated zone and moving a selected number of said supporting units out of said refrigerated zone into a contiguous secondary delivery zone and into an elevatable, closable compartment within said secondary zone, depressing said elevatable compartment toward ground-level, removing said elevatable compartment from said secondary zone, and moving said compartment to a selected point while closed and while containing said selected supported units with food supported thereon.

22. A method of transporting and distributing refrigerated perishable commodities which comprises loading said commodities, while chilled, into a refrigerated zone of a mobile, insulated, refrigerated, trackles vehicle, and supporting said commodities on a plurality of mobile supporting units disposed in said refrigerated zone adjacent the top thereof, sealing off said refrigerated zone, unsealing said refrigerated zone and moving a selected number of said supporting units out of said refrigerated zone and into an elevatable compartment within a secondary delivery zone in said vehicle, re-sealing said refrigerated zone, depressing said elevatable compartment to adjacent ground-level and removing said selected perishable commodities from said supporting units within said depressed elevatable compartment.

23. A method of transporting and distributing refrigerated perishable commodities which comprises loading said commodities, while chilled, into a refrigerated zone of a mobile, insulated, refrigerated, trackless vehicle, and supporting said commodities on a plurality of mobile supporting units disposed in said refrigerated zone adjacent the bottom thereof, sealing off said refrigerated zone, unsealing said refrigerated zone and moving a selected number of said supporting units out of said refrigerated zone and into an elevatable compartment within a secondary delivery zone in said vehicle, re-sealing said refrigerated zone, depressing said elevatable compartment to adjacent ground-level and removing said selected perishable commodities from said supporting units within said depressed elevatable compartment.

24. A method of transporting and distributing refrigerated perishable foods which comprises loading said foods, while chilled, into a refrigerated zone of an insulated, refrigerated, trackless vehicle, and supporting said foods on a plurality of mobile supporting units disposed adjacent the top of said refrigerated zone, sealing off said refrigerated zone, unsealing said refrigerated zone and moving a selected number of said supporting units out of said refrigerated zone into a contiguous secondary delivery zone and into an elevatable, closable compartment within said secondary zone, depressing said elevatable compartment toward ground-level, removing said elevatable compartment from said secondary zone, and moving said compartment to a selected point while closed and while containing said selected supporting units with food supported thereon.

25. A method of transporting and distributing refrigerated perishable foods which comprises loading said foods, while chilled, into a refrigerated one of an insulated, refrigerated, trackless vehicle, and supporting said foods on a plurality of mobile supporting units disposed adjacent the bottom of said refrigerated zone, sealing off said refrigerated zone, unsealing said refrigerated zone and moving a selected number of said supporting units out of said refrigerated zone into a contiguous secondary delivery zone and into an elevatable, closable compartment within said secondary zone, depressing said elevatable compartment toward ground-level, removing said elevatable compartment from said secondary zone, and moving said compartment to a selected point while closed and while containing said selected supporting units with food supported thereon.

THOMAS L. PECKINPAUGH.

REFERENCES CITED

The following references are of record in the file of this patent:

UNITED STATES PATENTS

| Number | Name | Date |
|---|---|---|
| 1,514,079 | Gehnrich | Nov. 4, 1924 |
| 1,907,217 | Rott | May 2, 1933 |
| 1,966,164 | Clark | July 10, 1934 |
| 2,125,205 | Snowden | July 26, 1938 |
| 2,200,436 | Van Blarcom et al. | May 14, 1940 |
| 2,330,339 | De More | Sept. 28, 1943 |
| 2,353,909 | Lager | July 18, 1944 |
| 2,405,054 | Pringle | July 30, 1946 |
| 2,442,549 | Pearlman | June 1, 1948 |
| 2,464,923 | Davis | Mar. 22, 1949 |